US012309902B2

(12) United States Patent
Dominguez Vicente et al.

(10) Patent No.: US 12,309,902 B2
(45) Date of Patent: May 20, 2025

(54) COOKING APPLIANCE

(71) Applicant: BSH Hausgeräte GmbH, Munich (DE)

(72) Inventors: Alberto Dominguez Vicente, Saragossa (ES); Pablo Jesus Hernandez Blasco, Saragossa (ES); Ignacio Lope Moratilla, Saragossa (ES); Antonio Muñoz Fumanal, Utebo (ES); Ramon Peinado Adiego, Saragossa (ES); Jorge Villa Lopez, Jaca (ES)

(73) Assignee: BSH Hausgeräte GmbH, Munich (DE)

( * ) Notice: Subject to any disclaimer, the term of this patent is extended or adjusted under 35 U.S.C. 154(b) by 872 days.

(21) Appl. No.: 17/436,094

(22) PCT Filed: May 8, 2020

(86) PCT No.: PCT/EP2020/062835

§ 371 (c)(1),
(2) Date: Sep. 3, 2021

(87) PCT Pub. No.: WO2020/229336

PCT Pub. Date: Nov. 19, 2020

(65) Prior Publication Data

US 2022/0191977 A1 Jun. 16, 2022

(30) Foreign Application Priority Data

May 10, 2019 (EP) .................................... 19382363

(51) Int. Cl.
*H05B 6/06* (2006.01)
*H05B 6/08* (2006.01)

(52) U.S. Cl.
CPC ............... *H05B 6/062* (2013.01); *H05B 6/08* (2013.01); *H05B 2213/05* (2013.01)

(58) Field of Classification Search
CPC ....... H05B 2213/05; H05B 6/062; H05B 6/08
USPC ....... 219/601, 620, 621, 622, 624, 626, 629, 219/632, 670, 671, 672, 675, 679, 680
See application file for complete search history.

(56) References Cited

U.S. PATENT DOCUMENTS

| | | | | |
|---|---|---|---|---|
| 8,686,321 | B2 | 4/2014 | De Angelis | |
| 10,694,589 | B2 * | 6/2020 | Blasco Rueda | H05B 6/062 |
| 2008/0087661 | A1 | 4/2008 | Bogel | |
| 2011/0036832 | A1 | 2/2011 | Zangoli | |

(Continued)

FOREIGN PATENT DOCUMENTS

| | | | |
|---|---|---|---|
| EP | 1734789 | A1 | 12/2006 |
| EP | 1951003 | A1 | 7/2008 |
| EP | 3001773 | A1 | 3/2016 |

OTHER PUBLICATIONS

International Search Report PCT/EP2020/062835 dated Jul. 23, 2020.

*Primary Examiner* — Quang T Van
(74) *Attorney, Agent, or Firm* — Michael E. Tschupp; Andre Pallapies; Brandon G. Braun

(57) ABSTRACT

A cooking appliance device includes a control and/or regulating unit which is provided such that in a periodic continuous heating operation state, which is allocated at least one operating period, an induction target is repetitively controlled, supplied with energy, and operated in a switched-on interval of the operating period with a heating power, and that in the continuous heating operating state a heating current frequency for the induction target in the switched-on interval of the operating period is varied.

24 Claims, 14 Drawing Sheets

(56) References Cited

U.S. PATENT DOCUMENTS

| | | | | |
|---|---|---|---|---|
| 2019/0261466 | A1 | 8/2019 | Cabeza Gozalo | |
| 2022/0191976 | A1* | 6/2022 | Cabeza Gozalo ..... | H05B 6/062 |

* cited by examiner

COOKING APPLIANCE

CROSS-REFERENCES TO RELATED APPLICATIONS

This application is the U.S. National Stage of International Application No. PCT/EP2020/062835, filed May 8, 2020, which designated the United States and has been published as International Publication No. WO 2020/229336 A1 and which claims the priority of European Patent Application, Ser. No. 19382363.0, filed May 10, 2019, pursuant to 35 U.S.C. 119 (a)-(d).

BACKGROUND OF THE INVENTION

The invention relates to a cooking appliance device and to a method for operating a cooking appliance device.

The prior art already discloses cooking appliance devices and in particular hobs that have inductors that are operated so as to heat different items of cookware in order to avoid intermodulation noises, wherein, as a consequence of increased customer requirements with regard to noise pollution and cooking temperatures for example, complex control schemes are used so as to control inductors in order to heat items of cookware, this hampers compliance with flicker and EMC standards and in turn results in an increase in a complexity of the control scheme.

The publication EP 3001773 B1 discloses in this connection an induction hob device having two inverters, which each operate one inductor, said induction hob device having a control unit that operates two inverters jointly in one time window of a continuous heating operating state and divides the time window into two time intervals, wherein the control unit constantly varies an in-total achieved heating power of the at least two inverters in a transition time interval of the two time intervals.

The publication U.S. Pat. No. 8,686,321 B2 discloses in this connection a method for supplying induction targets of an induction cooker with a heating power, said induction targets comprising in each case an inductor, wherein in one method step all inductors are supplied with the heating power with the aid of a previously determined control sequence in order to comply with an operator input.

BRIEF SUMMARY OF THE INVENTION

The object of the invention is in particular to provide a generic cooking appliance device having improved characteristics with respect to a control.

The invention is based on a cooking appliance device, in particular on an induction hob device, having at least one control and/or regulating unit that is provided so as in at least one periodic continuous heating operation state, which is allocated at least one operating period, to repetitively control at least one induction target and to supply said induction target with energy and to operate the induction target in at least one switched-on interval of the operating period with a heating power, in particular a desired heating power or an excess power with respect to a desired heating power.

It is proposed that the control and/or regulating unit is provided so as in the continuous heating operating state to vary a heating current frequency for the induction target in the switched-on interval of the operating period.

The embodiment in accordance with the invention renders it possible to provide a generic cooking appliance device having improved characteristics with respect in particular to compliance with EMC standards in the case in particular of precisely achieving desired heating powers, and in particular with respect to compliance with flicker standards and in particular with respect to a low-noise operation. By advantageously complying with EMC standards, it is possible to reduce the number of EMC filters, in particular to forego the use of EMC filters. As a consequence, it is possible to achieve a cost-efficient cooking appliance device. As a consequence, it is possible to achieve an energy-saving cooking appliance device. This renders it possible to produce an advantageously energy-saving cooking appliance device, in particular by using cost-efficient and/or relatively low-power components. It is advantageously possible to achieve a low-noise operation that conforms to EMC standards for the cooking appliance device, in particular in the case of heating multiple induction targets. In particular, it is possible to achieve that frequency spread techniques can be used in combination with controlling of induction targets in accordance with the invention. An advantageously precisely defined average heating power can be achieved on account of advantageous switched-on intervals. In particular, a reliable embodiment can be achieved preferably with regard to a desired heating power that is requested by the operator. In particular, it is possible to achieve that in a time period known from the prior art for the operating periods, such as for example 10 ms, an average heating power corresponds advantageously precisely to a desired heating power requested by the operator. This advantageously prevents an intermittent cooking procedure. In particular, it is possible to achieve advantageous melting procedures for chocolate. It is particularly advantageous to be able to achieve that the cooking appliance device avoids a maximum power requirement of greater than 4.25 kW, preferably greater than 3.7 kW or equivalent 16 $A_{ms}$. As a consequence, it is advantageously possible to avoid power outages or having to switch off the cooking appliance device for safety reasons. In particular, it is possible to avoid rapid perturbations such as cookware shifting or ferromagnetic and ferrimagnetic saturations. It is advantageously possible to achieve that the cooking appliance device can be operated so as to comply with EMC standards irrespective of the number of induction targets and irrespective of the design of the cooking appliance device, in particular irrespective of the components that are installed.

The term a “cooking appliance device”, advantageously an “induction hob device”, is to be understood in particular to mean at least one part, in particular a sub-assembly of a cooking appliance, in particular of an oven, for example of an induction oven, and advantageously of a hob and particularly advantageously an induction hob. A household appliance that has the cooking appliance device is advantageously a cooking appliance. A household appliance that is embodied as a cooking appliance could be, for example, an oven and/or a microwave and/or a grill appliance and/or a steam cooking appliance. A household appliance that is embodied as a cooking appliance is advantageously a hob and preferably an induction hob.

The term a “control and/or regulating unit” is to be understood to mean in particular an electronic unit that is preferably integrated at least in part in a cooking appliance device, in particular in an induction hob device, and said electronic unit is provided in particular so as to control and/or regulate at least one inverter unit of the cooking appliance device having at least one inverter, in particular a resonance inverter and/or a dual half bridge inverter. In particular, the control and/or regulating unit evaluates a signal that is provided by a unit, in particular by a sensor and/or detecting unit, whereby the control and/or regulating unit, in particular in the case of fulfilling at least one condition, can initiate a specific procedure and/or operating state. It is preferred that the control and/or regulating unit comprises a computing unit and in particular, in addition to the computing unit, a storage unit having a control and/or regulating program that is stored therein and is provided for the purpose of being implemented by the computing unit.

In particular, the cooking appliance device can have a switching unit that is embodied in particular as a semiconductor switching element, in particular as a transistor. In particular, the switching unit is controlled and/or regulated by the control and/or regulating unit, wherein the switching unit produces in particular an electrical connection between at least one energy source and at least one energy consumer, for example one of the induction targets. The switching unit can have in particular at least one switching element that is electromechanical or semiconductor-based and can be provided so as to produce at least one electrical connection at least between the at least one energy source and at least the one induction target. The term a "switching element" is to be understood in particular to mean an element that is provided so as to produce and/or interrupt an electrically conductive connection between two points, in particular contacts of the switching element. It is preferred that the switching element has at least one control contact by way of which it is possible to connect the switching element. In particular, the switching element is embodied as a semiconductor switching element, in particular as a transistor, for example as a metal oxide semiconductor field effect transistor (MOSFET) or organic field effect transistor (OFET), advantageously as a bipolar transistor having preferably an insulated gate electrode (IGBT). Alternatively, the switching element is embodied as a mechanical and/or electromechanical switching element, in particular as a relay.

The term an "induction target" is to be understood in particular to mean an inductor or a multiplicity of inductors that is/are in particular part of the cooking appliance device and have cookware placed over the inductor and/or over the multiplicity of inductors, wherein the inductor or the multiplicity of inductors are provided in particular jointly in at least one in particular specific operating state, in particular in at least one continuous heating operating state, so as to inductively heat the item of the cookware that is placed over the inductor or over the multiplicity of inductors. In this case, the inductors of the induction target can provide in each case an identical heating power in comparison to one another in at least the continuous heating operating state. It is preferred that the control and/or regulating unit controls the inductors of an induction target at an identical heating current frequency. Moreover, the inductor, in particular precisely one individual inductor, of the induction target can provide a different heating power temporally during at least the continuous heating operating state. The control and/or regulating unit is provided in particular so as to define at least one induction target. In particular, the control and/or regulating unit can define multiple induction targets. The cooking appliance device has in particular at least one inductor, in particular a multiplicity of inductors. The term an "inductor" is to be understood here in particular to mean an element that in at least one continuous heating operating state supplies at least one item of cookware with energy for the purpose of heating the item of cookware, said energy being in particular in the form of a magnetic alternating field that is provided so as to produce eddy currents and/or remagnetization effects in a metal preferably at least in part ferromagnetic heating means, in particular in an item of cookware, said eddy currents and/or remagnetization effects being converted into heat. The inductor has in particular at least one induction coil and is in particular provided so as to supply the item of cookware with energy in the form of a magnetic alternating field at an, in particular short-term variable, heating current frequency.

The term a "heating current frequency" is understood in particular to mean a frequency of an electrical alternating current in a range of 20 kHz-100 kHz, preferably 30 kHz-75 kHz, which is applied to an inductor so as to generate an alternating magnetic field. The term "short-term variable" is to be understood to mean that a parameter can be varied in one time duration, wherein the time duration is shorter than the operating period. The inductor is arranged in particular below and advantageously in an immediate vicinity of at least one resting plate of the cooking appliance device. In particular, the multiplicity of inductors can be arranged in a matrix-like manner, wherein the inductors that are arranged in a matrix-like manner can form a variable cooking surface. In particular, it is possible to combine the inductors with one another to create arbitrarily large induction targets, in particular having different contours. Alternatively or in addition thereto, it is possible for the inductors to also be arranged in the form of a classic cooking mirror, in particular having two, three, four or five, heating zones that are highlighted in particular with respect to the rest of the surface of the resting plate that is embodied as a matrix hob.

The expression "to supply an object with energy" is to be understood to mean in particular to provide an electrical energy in the form of an electrical voltage, an electrical current and/or an electrical and/or electromagnetic field of at least one energy source for the object. The term an "energy source" is to be understood in particular to mean a unit that provides an electrical energy in the form of an electrical voltage, an electrical current and/or an electrical and/or electromagnetic field to at least one further unit and/or at least one electrical current circuit. The energy source can be in particular an electrical current phase of a current supply network. In particular by way of a regulating unit, the energy source can provide a maximum power of 3.7 kW or can be limited to a maximum power output of 3.7 kW. Advantageously, it is possible to arrange an inverter unit between the energy source and at least one induction target, preferably all the induction targets, so as to provide a high frequency supply voltage at a suitable, in particular short-term variable heating current frequency. The energy source can also have in particular an inverter unit. In particular, the inverter unit, in particular of the cooking appliance device, can have at least one, in particular at least two or also multiple inverters, so as to provide a high frequency voltage at a suitable, in particular short-term variable heating current frequency for induction targets. In particular, a heating current frequency is different from the frequency of a supply voltage. It is preferred that the control and/or regulating unit is provided so as to select and/or set the heating current frequency in a range of 20 kHz to 100 kHz, preferably 30 kHz to 75 kHz. In particular, each induction target has a dedicated maximum frequency at which said induction target can be operated. The maximum frequency of an induction target depends upon the construction type, the components and other technical limitations. For example, the maximum frequency of an induction target can amount to 75 kHz or 100 kHz. An induction target that is operated at its maximum frequency generates a minimum possible heating power, in particular output heating power, in particular during its switched-on time. The term an "output heating power" of an induction target is understood in particular to mean an electrical power that the at least one inductor of the at least one induction target provides to an item of cookware of the at least one induction target so as to heat said item of cookware in at least one time interval, in particular at least one switched-on interval, of the operating period of the continuous heating operating state.

The term a “continuous heating operating state” is to be understood in particular to mean an operating state that is embodied differently from a frequency sweep state and in which a specific control of a unit, in particular of at least one induction target, in particular of at least two induction targets, is performed so as to achieve a desired heating power for the duration of the state, and/or the control and/or regulating unit is provided for the purpose of applying a specific method and/or a specific algorithm to the unit, in particular to the induction targets so as to achieve a desired heating power for the duration of the state, wherein in particular the control and/or regulating unit operates the at least one in particular the at least two induction targets in a coordinated manner. In particular, the continuous heating operating state lasts, in particular in a temporally uninterrupted manner, at least 10 ms, preferably at least 1 s, advantageously at least 60 s and particularly preferably at least 30, 30’0 s, wherein the control and/or regulating unit is provided so as to supply electrical energy in the form of an output heating power in particular to at least one induction target, in particular by means of the applied, in particular short-term variable, heating current frequency, wherein the output heating power is advantageously not equal to 0, in particular is greater than 0 and in particular corresponds in a temporal average to a desired heating power. In particular, a temperature increase of an item of cookware of the induction target and/or a temperature increase and/or an at least in part phase transition of an item of food that is located in the item of cookware takes place in the continuous heating operating state. In particular, the temperature increase of the item of cookware and/or of the item of food amounts in particular to at least 0.5° C., advantageously at least 1° C., preferably at least 5° C. and particularly advantageously at least 10° C. In particular, a mass proportion of the food that experiences a phase transition amounts to at least 1%, advantageously at least 5%, preferably at least 10% and particularly advantageously at least 20%. In particular, the continuous heating operating state is embodied differently from a frequency sweep state. The term a “frequency sweep state” is to be understood to mean a state in which the control and/or regulating unit is provided so as to record and/or measure and store a frequency spectrum that is available for at least one induction target and has the heating powers, in particular output heating powers, which are achieved and associated with said frequency spectrum.

In the continuous heating operating state, the control and/or regulating unit adjusts in particular at least one output heating power of the at least one induction target, advantageously at least a large portion of the output heating power of the at least one induction target and preferably all output heating powers of the at least one induction target by means of an in particular short-term variable heating current frequency and/or by means of mutually phase-shifted control signals and/or by means of a duty cycle.

The term a “repetitive control” of a unit or the term “to repetitively control” a unit is to be understood here in particular to mean a periodically repeating control of a unit in the at least one continuous heating operating state, in particular by way of an electrical signal. The induction target is preferably repetitively controlled in the continuous heating operating state with the operating period. It is preferred that the control and/or regulating unit repeats the control out of an individual operating period at least of one induction target within an individual continuous heating operating state, in particular until this continuous heating operating state is terminated by an operator input. In particular, the operating period in particular the control of the induction targets of an operating period is repeated over the entire duration of the continuous heating operating state.

The term “operating period” is to be understood in particular to mean a time period during which the control and/or regulating unit is provided so as to operate the induction target in a continuous heating operating state. In particular, the induction target is activated during the operating period, wherein the induction target can be supplied with electrical energy, wherein the electrical energy can be infinitesimally small. It is preferred that the duration of an operating period corresponds to a period duration of a rectified alternating current supply and/or alternating voltage supply. It is preferred that the control and/or regulating unit is provided so as to supply and/or operate the at least one induction target within an operating period of the continuous heating operating state with an average electrical power. The term an “average electrical power” is to be understood in particular to mean an electrical power that is supplied averaged over a time period, in particular over an operating period, in particular to the induction target. It is preferred that the average electrical power corresponds to a desired heating power that is set in particular by the operator. The term “desired heating power” is to be understood in particular to mean the power that is desired by an operator and is to be supplied to an induction target at least in the temporal middle of the continuous heating operating state. In particular, a desired heating power can also be a zero heating power. The term “zero heating power” is to be understood to mean an infinitesimally low power. It is preferred that each different operator input of a desired heating power leads to a different continuous operating state, in particular to a different control of the at least one induction target in the operating period of the continuous heating operating state.

The term an “excess power” of an induction target is to be understood in particular to mean a power whose average value in relation to a time interval of the operating period exceeds the average power, in particular desired heating power, of the induction target within an operating period of the continuous heating operating state. In particular, the control and/or regulating unit is provided so as to achieve the excess power by applying an electromagnetic alternating field at a heating current frequency that is different from a target frequency.

The term “target frequency” is to be understood to mean a heating current frequency that in an operation of the at least one induction target achieves in the induction target at each point in time a desired heating power that is required and/or set by the operator. In particular, the excess power is achievable in the case of an operation of the hob device in a ZVS mode at a heating current frequency which is lower than the target frequency. In particular, the excess power is achievable in the case of an operation of the hob device in a ZCS mode at a heating current frequency which is higher than the target frequency. The term a “ZVS mode” is to be understood to mean in particular a zero voltage switching mode in which in the case of a switching procedure of a switching element a voltage that has a value of approximately equal to zero is applied. The term a “ZCS mode” is to be understood to mean in particular a zero current switching mode in which in the case of a switching procedure of a switching element a current that has a value of approximately equal to zero is present. In particular, the heating current frequencies are selected by the control and/or regulating unit in such a manner that the heating current frequencies do not generate any intermodulation interfering signals which are acoustically perceivable by human beings with an average hearing ability. In particular, the intermodulation interfering signals arise by coupling at least two heating current frequencies that have a frequency spacing with respect to one another of less than 20 kHz in particular less than 17 kHz.

The term a "power deficit" is to be understood in particular to mean a power whose average value in relation to a time interval is below the average power of an induction target. In particular, the power deficit can be achieved by applying an electromagnetic alternating field at a heating current frequency that is different from a target frequency, wherein in the case of an operation of the induction target at the target frequency a power is provided that is required and/or set by the operator. In particular, the power deficit is achievable in the case of an operation of the hob device in a ZVS mode at a heating current frequency that is higher than the target frequency. In particular, the power deficit is achievable in the case of an operation of the hob device in a ZCS mode at a heating current frequency that is lower than the target frequency.

The term "provided" is to be understood in particular to mean especially programmed, designed and/or equipped. This term is also to be understood to mean that an object is provided so as to perform a specific function and that the object fulfills and/or performs this specific function in at least one application state and/or operating state and/or in a continuous heating operating state.

The operating period has at least one time interval, in particular a switched-on interval, in which the control and/or regulating unit operates the induction target at a heating current frequency, in particular so as to achieve an output heating power, in particular a desired heating power, in the at least one induction target. The operating period can have at least one time interval, in particular a switched-off interval in which the induction target is operated free of a heating current frequency, in particular so as to achieve a zero heating power in the at least one induction target. In particular the operating period can be divided into at least two time intervals during which the control and/or regulating unit operates the induction target. The term a "time interval" is to be understood in particular to mean a time period whose duration is longer than 0 s and shorter than or equal to the length of the operating period. A sum, in particular a duration of the sum, of all time intervals of the operating period of individual induction targets corresponds precisely to a duration of the operating period of the respective induction target. In particular, individual time intervals can have a different duration from one another.

It is preferred that the control and/or regulating unit is provided so as in the continuous heating operating state to select a target frequency at which the induction target achieves in an essentially constant manner the desired heating power that is set by an operator. The control and/or regulating unit is provided in particular so as in the continuous heating operating state to determine the electrical conductance of the induction target that matches this target frequency. The control and/or regulating unit is provided in particular so as in the continuous heating operating state to vary the heating current frequency in the operating period at least ten times, preferably at least twenty times, preferably at least a hundred times. The control and/or regulating unit is provided in particular so as in the continuous heating operating state to vary the heating current frequency in the operating period a maximum of seven hundred and fifty times, preferably a maximum of a thousand times. The control and/or regulating unit is in particular provided so as in the continuous heating operating state to vary the heating current frequency in the operating period in order to counteract any distortion of the waveform of the supply current as a result of the dependency of the waveform of the supply current on the signal strength, in particular amplitude, and the temperature, in particular in order to comply with EMC standards. The control and/or regulating unit is provided in particular so as in the continuous heating operating state to measure the heating current frequency or a proportional operating parameter in the operating period at least ten times, preferably at least twenty times, preferably at least a hundred times. The term an "alternating voltage supply" is to be understood to mean in particular the 50 Hz, in particular 60 Hz, alternating voltage from the current supply network.

In addition, it is proposed that the control and/or regulating unit is provided so as in the continuous heating operating state to maintain at least essentially constant at least one impedance at least of one unit that has the induction target within the switched-on interval. In particular, the waveform of the supply current is distorted as a result of a variation of the impedance of the unit, which comprises at least the induction target, in particular because the impedance is dependent upon the material of the cookware. The control and/or regulating unit is provided in particular so as to maintain essentially constant at least within the switched-on interval the impedance of the at least one unit that has the induction target by varying, in particular regulating, the heating current frequency in the switched-on interval. It is preferred that the unit that has the induction target comprises at least one resonance capacitor unit. The at least one resonance capacitor unit comprises at least one, preferably two, capacitors. It is preferred that the control and/or regulating unit is provided so as in the continuous heating operating state to operate the unit that has the induction target as a resonant circuit. It is preferred that the unit that has the induction target comprises at least one inductor, at least one resonance capacitor unit and an item of cookware. The term "maintain essentially constant" is to be understood preferably to mean that the control and/or regulating unit controls and/or regulates an operating parameter to a value except for deviations of a maximum 25%, preferably 10%, particularly preferably 5% above at least 70%, preferably at least 80%, particularly preferably at least 90% of a corresponding time period. As a result, it is advantageously possible to achieve a reduction in the distortion of the waveform of the supply current.

Moreover, it is proposed that the control and/or regulating unit is provided so as in the continuous heating operating state to maintain constant at least one actual conductance at least of one unit that has the induction target within the switched-on interval. The term "actual conductance" is to be understood to mean preferably a conductance, a reciprocal value of the actual portion of the impedance, in particular of the effective resistance. It is preferred that the control and/or regulating unit can determine a target frequency from an operator input of the desired heating power. In particular, the induction target in the case of an operation at the target frequency as the heating current frequency can constantly provide the desired heating power in the operating period, in particular also averaged over the duration of the operating period. It is preferred that the control and/or regulating unit in the case of the target frequency can determine the actual conductance of the unit that has the induction target by way of the heating power, in particular the output heating power. It is preferred that the control and/or regulating unit determines the actual conductance with respect to a desired heating power prior to the commencement of the first operating period of the continuous heating operating state. It is conceivable that the control and/or regulating unit is provided so as to determine the actual conductance of a unit that has the induction target with respect to each desired heating power, in particular with respect to each possible heating current frequency, in the frequency sweep state. It is likewise feasible that the control and/or regulating unit is provided so as to start the frequency sweep state in the case of an item of cookware being placed over the inductor. In this case, it is conceivable that a continuous heating operating state can be adopted by the control and/or regulating unit only after the frequency sweep state has ended. It is preferred that the control and/or regulating unit is provided so as in the continuous heating operating state to maintain constant the actual conductance at least of the unit that has the induction target within the switched-on interval by way of a variation of the heating current frequency. It is preferred that the control and/or regulating unit can determine the actual conductance, in particular the conductance or the reciprocal value of the actual portion of the impedance, by way of the following equation:

$$G = \left\langle \frac{i_L \cdot v_0(t)}{v_{0,rms}^2} \right\rangle_T,$$

wherein G is the actual conductance and the square brackets with the subscript T represent a temporal average operation, $i_L$ is the current that is applied at the unit that has the induction target, in particular in series at the induction target and the resonance capacity unit, $v_0(t)$ is the voltage that is prevailing at each point in time t and which is applied at the unit that has the induction target and $v_{o,rms}$ is the root mean square value of the voltage $v_0(t)$. The control and/or regulating unit can calculate root mean square values and average values over a number N of periods of the heating current, preferably at least 100 µs. It is preferred that a period of heating current is formed between 12.5 µs and 50 µs long. It is preferred that the control and/or regulating unit calculates the root mean square values and average values, for example of the voltage $v_0$, over at least eight, preferably at least ten, preferably at least twelve, particularly preferably at least fifteen, periods of the heating current so as to provide reliable values with a maximum error of +/−10%, preferably +/−5%. The control and/or regulating unit can vary the heating current frequency after each calculation of the actual conductance so as to maintain constant the actual conductance. It is conceivable that the control and/or regulating unit calculates the impedance, in particular the reciprocal value of the actual conductance, in the operating period as often, for example every 50 µs, as the actual conductance. It is thereby advantageously possible to achieve that despite a variation of the heating current frequency in the operating period the desired heating power is achieved over the operating period in the middle. As a result, it is possible to achieve an advantageous cooking environment whilst complying with EMC standards.

Furthermore, it is proposed that the control and/or regulating unit is provided so as in the continuous heating operating state to maintain constant a complex conductance at least of one unit that has the induction target within the switched-on interval. The term a "complex conductance" is to be understood to mean preferably the admittance, a reciprocal value of the impedance or of the alternating current resistance. It is preferred that the control and/or regulating unit can determine a target frequency from an operator input of the desired heating power. In particular the induction target can in the case of an operation at the target frequency as the heating current frequency provide constantly the desired heating power in the operating period, in particular also averaged over the duration of the operating period. It is preferred that the control and/or regulating unit can in the case of the target frequency determine by way of the heating power, in particular the output heating power, the complex conductance of the unit that has the induction target. It is preferred that the control and/or regulating unit determines the complex conductance with respect to the desired heating power prior to a commencement of the first operating period of the continuous heating operating state. It is conceivable that the control and/or regulating unit is provided so as to determine the complex conductance of a unit that has the induction target with respect to each desired heating power, in particular with respect to each possible heating current frequency, in the frequency sweep state. It is preferred that the control and/or regulating unit is provided so as in the continuous heating operating state to maintain constant the complex conductance at least of the unit that has the induction target within the switched-on interval by way of a variation of the heating current frequency. It is preferred that the control and/or regulating unit can determine the complex conductance, in particular the admittance, in particular the reciprocal value of the impedance, by way of the following equation:

$$Y = \frac{i_{L,rms}}{v_{0,rms}},$$

wherein Y is the complex conductance and $i_{L,rms}$ is the root mean square value of the current that is present at the unit that has the induction target, in particular in series on the induction target and the resonance capacitor unit. The control and/or regulating unit can calculate root mean square values and average values over a number N of periods of the heating current, preferably at least 100 µs. It is preferred that a period of heating current is formed between 12.5 µs and 50 µs long. It is preferred that the control and/or regulating unit calculates the root mean square values and average values, for example of the current $i_{L,rms}$, over at least eight, preferably at least ten, preferably at least twelve, particularly preferably at least fifteen, periods of the heating current so as to provide reliable values with a maximum error of +/−10%, preferably +/−5%. The control and/or regulating unit can vary the heating current frequency after each calculation of the complex conductance so as to maintain constant the complex conductance. It is conceivable that the control and/or regulating unit calculates the impedance, in particular the reciprocal value of the complex conductance, in the operating period as often, for example every 50 µs, as the complex conductance. It is conceivable that the control and/or regulating unit calculates the impedance, in particular the reciprocal value of the complex conductance, in the operating period as often, for example every 50 µs, as the complex conductance, so as to maintain constant as an alternative the impedance of the unit that has the induction target. As a result, it is advantageously possible to achieve that any distortion of the supply current is minimized by maintaining constant the complex conductance. As a result, it is possible to achieve that the cooking appliance device can comply in particular in an advantageously precise manner with the EMC standards.

Furthermore, it is proposed that the control and/or regulating unit is provided so as in the continuous heating operating state to control and/or regulate the heating current frequency by a target frequency. It is advantageously possible to achieve thereby that the achieved heating power corresponds at each point in time essentially to the desired heating power. As a result, it is possible to advantageously maintain the desired heating power despite a variation of the heating current frequency in the operating period.

Furthermore, it is proposed that the control and/or regulating unit is provided so as in the continuous heating operating state to constantly vary the heating current frequency in the switched-on interval. The term "constantly vary" is to be understood to mean in this connection preferably that the heating current frequency is varied, in particular adapted, in the operating period in constant intervals at least ten times, preferably at least twenty times, preferably at least twenty five times, in particular preferably fifty times. As a result, it is possible to achieve in an advantageously precise manner that the predetermined operating parameters are maintained constant, in particular the operating parameters of the actual conductance, of the complex conductance and/or of the impedance.

Furthermore, it is proposed that the control and/or regulating unit is provided so as in the continuous heating operating state to apply at least one frequency spread by means of at least one reference curve of the actual and/or the complex conductance at least of the unit that has the induction target to at least one harmonic at least of one of the heating current frequencies. It is preferred that the control and/or regulating unit applies a frequency spread in a middle range, in particular middle 60% of the operating period, in particular if the operating period corresponds to half of the period duration of an alternating voltage supply. It is preferred that the control and/or regulating unit applies frequency spreads in order in the operating period to attenuate a harmonic, in particular harmonics, of the heating current frequency in particular energetically and/or technically with regard to the power. It is preferred that the control and/or regulating unit can with regard to a frequency spread predetermine a reference curve, in particular having a wave-shaped curve in the middle of the operating period, of the actual and/or of the complex conductance and vary the heating current frequency in the operating period accordingly in order to achieve this reference curve. It is preferred that the reference curve has in the central region, in particular middle region, of the operating period a wave-shaped curve around determined values for the actual or complex conductance at which the induction target achieves the desired heating power. It is preferred that the wave-shaped curve is a sinusoidal curve. Other reference curves in the central region, in particular middle region, of the operating period are also conceivable, such as for example a zigzag curve, a squared curve or a triangular curve. It is conceivable that the frequency spread extends over a central region, in particular middle region, of 60%, 70% or 90% of the operating period. It is preferred that the complex or actual conductance that is predetermined by the reference curve deviates at a maximum 25%, preferably a maximum 15%, in particular preferably a maximum 10%, from the determined value for the actual or complex conductance at which the induction target achieves the desired heating power, in particular which is maintained constant in the other regions of the operating period. As a consequence, it is possible to achieve an advantageous distribution of energy and/or power of individual harmonics of the heating current frequency. As a result, it is possible to comply in an advantageous manner with EMC standards.

Furthermore, it is proposed that the control and/or regulating unit is provided so as in the continuous heating operating state to repetitively control at least a second induction target and supply said second induction target with energy and to operate the induction target in at least one second switched-on interval of the operating period with a heating power, in particular a desired heating power or an excess power with respect to a desired heating power. As a result, it is possible to achieve an advantageous cooking environment with multiple items of cookware whilst complying with EMC standards.

Furthermore, it is proposed that the control and/or regulating unit is provided so as in the continuous heating operating state to vary a second heating current frequency for the second induction target in the second switched-on interval of the operating period. It is preferred that the control and/or regulating unit can maintain essentially constant the impedance, the actual conductance or the complex conductance of a unit that has the second induction target by way of a variation of the second heating current frequency. It is preferred that the control and/or regulating unit can control and/or regulate the operating parameters of the unit that has the second induction unit in a similar manner to the operating parameters of the unit that has the induction target. It is preferred that the control and/or regulating unit can control and/or regulate the operating parameters of each unit that has at least one induction target in a similar manner to the operating parameters of the unit that has the induction target. As a result, an advantageous cooking environment is achieved. As a result, it is possible to achieve an advantageous cooking environment during operation with multiple items of cookware whilst advantageously complying with EMC standards In addition, it is proposed that the control and/or regulating unit is provided so as in the continuous heating operation state to avoid intermodulation noises at least of two different induction targets. As a result, an advantageous cooking environment can be achieved although for at least two units that have at least one induction target the heating current frequency is varied.

Furthermore, a cooking appliance, in particular an induction hob, having at least one cooking appliance device is proposed.

The invention is moreover based on a method for operating a cooking appliance device, in particular an induction hob device, wherein in at least one periodic continuous heating operating state, which is allocated at least one operating period, at least one induction target is repetitively controlled and supplied with energy and the induction target is operated in at least one switched-on interval of the operating period with a heating power, in particular a desired heating power or an excess power with respect to a desired heating power.

It is proposed that in the continuous heating operating state the heating current frequency is varied in the switched-on interval of the operating period. In particular the heating current frequency is varied in the switched-on interval of the operating period so as to maintain constant the actual and/or the complex conductance of the unit that has an induction target. As a result, it is advantageously possible to comply with EMC standards.

It is advantageously possible to operate the cooking appliance device irrespective of the number of induction targets and irrespective of the design of the cooking appliance device, in particular of the components installed, so as to comply with EMC standards.

The cooking appliance device is not to be limited in this case to the above described application and embodiment. In particular, the cooking appliance device can have a different number of individual elements, components and units to the number mentioned herein so as to fulfill a functionality described herein.

Further advantages are disclosed in the following description of the drawings. An exemplary embodiment of the invention is illustrated in the drawings. The drawings, the description and the claims disclose numerous features in combination. The person skilled in the art will also consider the features in an expedient manner individually and combine them to form expedient further combinations.

DETAILED DESCRIPTION OF EXEMPLARY EMBODIMENTS OF THE PRESENT INVENTION

Figure 1:
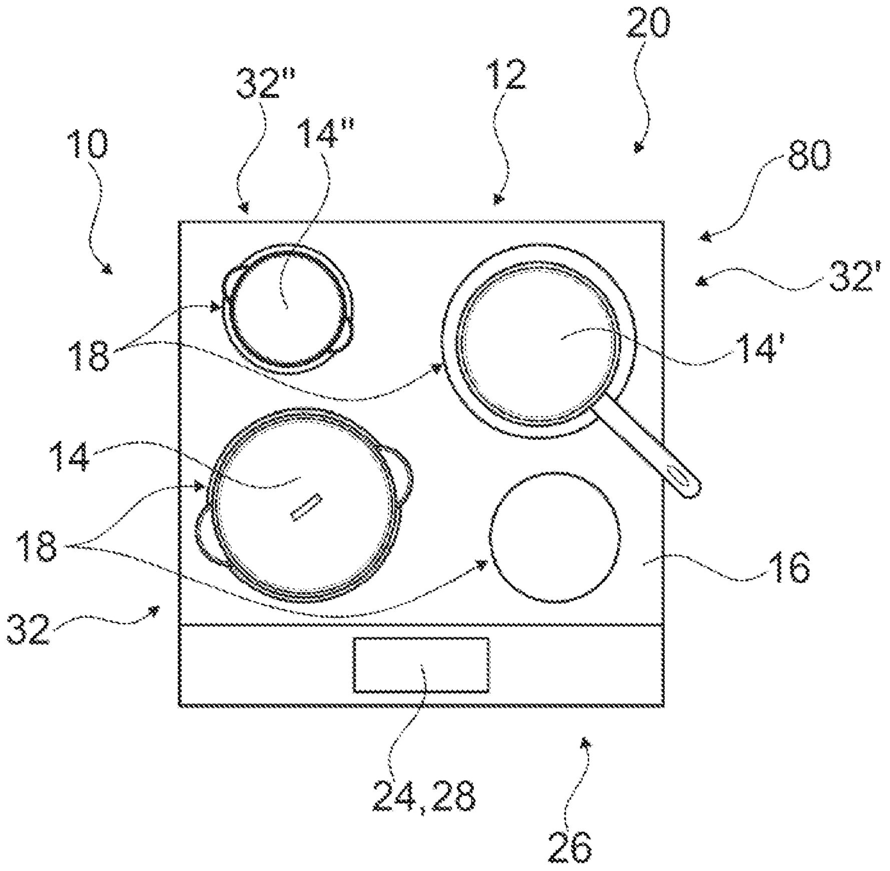
FIG. 1 shows a hob with a cooking appliance device and as an example with items of cookware placed thereon.

Where more than one object appears in the figures in part only one of said objects is provided with a reference numeral.

FIG. 1 illustrates a cooking appliance 20 that is embodied as a hob 12, in particular as an induction hob, and three items of cookware 14, 14', 14" that are placed thereon.

The cooking appliance 20 has a resting plate 16. The resting plate 16 is provided for the cookware 14, 14', 14" to be placed thereon. The resting plate 16 is embodied as a hob plate. In the illustrated exemplary embodiment, the cooking appliance 20 has four classic cooking zones 18. However, it is also conceivable as an alternative that the cooking appliance 20 is embodied as a matrix hob. An item of cookware 14, 14' 14" is arranged respectively on three of the four cooking zones 18.

The cooking appliance 20 has a cooking appliance device 10 that is embodied as an induction hob device.

Figure 2:
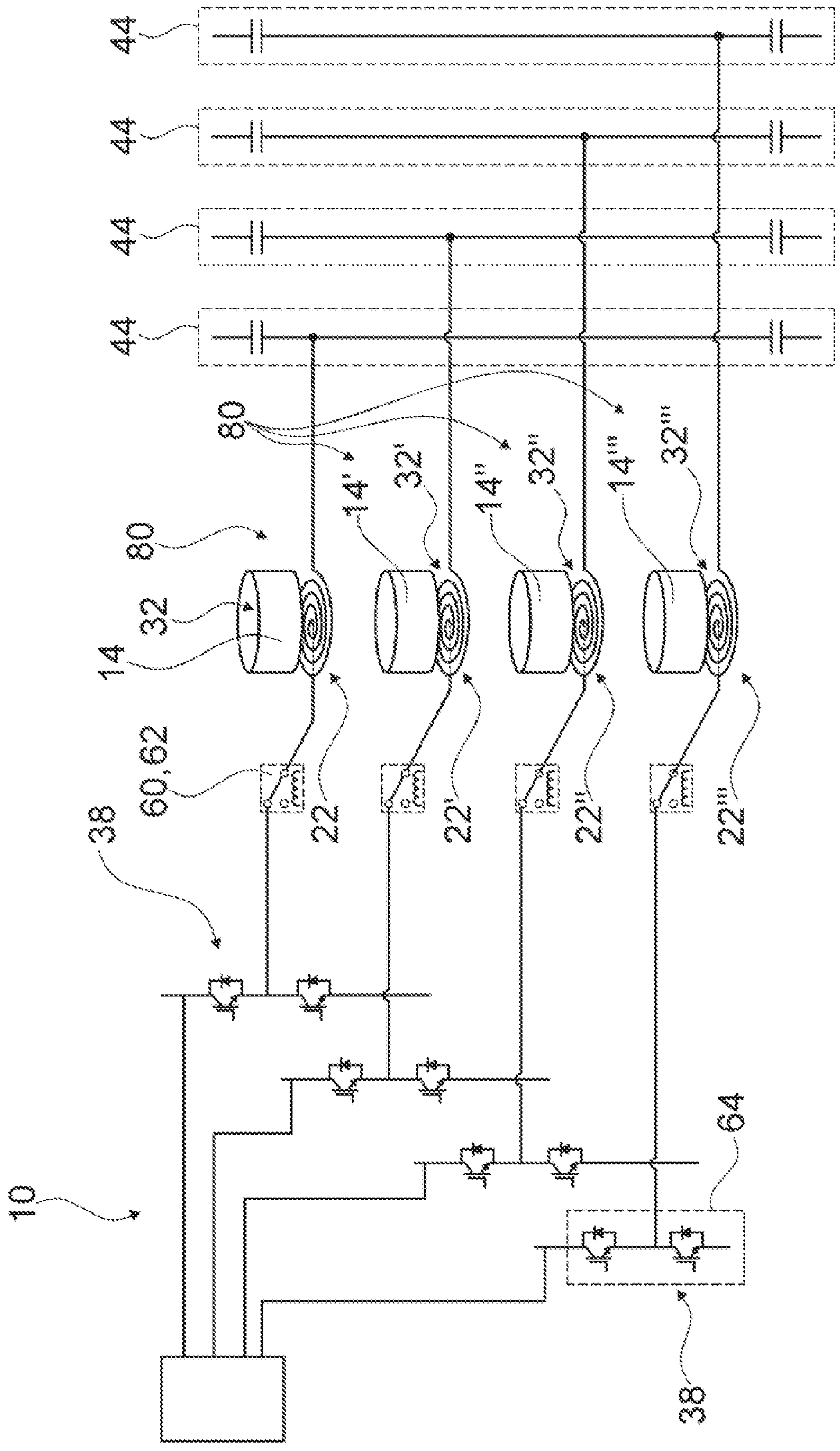
FIG. 2 shows the cooking appliance device with four induction targets that are defined by a control and/or regulating unit.

The cooking appliance device 10 has a multiplicity of inductors 22, 22', 22", 22'''. FIG. 2 illustrates as an example a cooking appliance device 10 having respectively an inductor 22, 22', 22", 22''' for each cooking zone 18 or for each item of cookware 14, 14', 14", 14'''. An inductor 22, 22', 22", 22''' is allocated precisely to one cooking zone 18. It is conceivable that in the case of a matrix hob the inductors 22, 22', 22", 22''' are arranged in a matrix-like manner below the resting plate 16 in order to create a uniform cooking zone 18. It is likewise conceivable that in the case of a matrix hob multiple inductors 22, 22', 22", 22''' are arranged in individual regions of the resting plate 16 in order to create different cooking zones for example rapid cooking zones, wherein the matrix hob renders it possible to continue to use the entire surface of the resting plate 16 for cooking. In the present example, the cooking appliance device 10 has four inductors 22, 22', 22", 22'''.

The inductors 22, 22', 22", 22''' are arranged in the installed state below the resting plate 16, in particular within the cooking appliance device 10. The inductors 22, 22', 22", 22''' are each provided so as in a periodic continuous heating operating state 50 to heat, in particular inductively, an item of cookware 14, 14', 14", 14''' that is placed on the resting plate 16 over the inductors 22, 22', 22", 22'''.

The cooking appliance device 10 comprises a control panel 24 for an operator to input and/or select operational parameters. For example, an operational parameter can be embodied as a desired heating power 30, 30' and/or as a cooking duration, wherein the operational parameter can be adjusted in particular as a discrete and/or an abstract value for example in quantized intervals or from a pool of an essentially continuous value range. The control panel 24 can be embodied as a display 28, in particular a touch screen display. The control panel 24 is provided so as to output to the operator at least one operational parameter.

The cooking appliance device 10 has a control and/or regulating unit 26. The control and/or regulating unit 26 is provided so as in dependence upon the operational parameter that is input by the operator, such as the desired heating power 30, 30' or a cooking duration, to perform programs, actions and/or algorithms and/or to vary the settings of the cooking appliance device 10.

Based on the cookware 14, 14', 14'', 14''' that is placed on the resting plate 16, the control and/or regulating unit 26 defines in this case for example multiple induction targets 32, 32', 32'', 32'''. In FIG. 1, two induction targets 32, 32' are defined by the control and/or regulating unit 26 based on the cookware 14, 14' that is placed on the resting plate 16 and defines the inductors 22, 22' that are arranged below the resting plate 16. In FIG. 2, four induction targets 32, 32', 32'', 32''' are defined by the control and/or regulating unit. An induction target 32, 32', 32'', 32''' has precisely one inductor 22, 22', 22'', 22'''. An induction target 32, 32', 32'', 32''' has at least one item of cookware 14, 14', 14'', 14''. In particular, in dependence upon the configuration of the hob 12 and the cookware 14, 14', 14'', 14''' that is located thereon, the control and/or regulating unit 26 can define a multiplicity of induction targets 32, 32', 32'', 32'''.

The control and/or regulating unit 26 heats an item of cookware 14, 14', 14'', 14''' by applying a heating current frequency 36 to the respective inductor 22, 22', 22'', 22'''. A particularly momentarily achieved output heating power 34 of each induction target 32, 32', 32'', 32''' is significantly dependent upon the heating current frequency 36 that is applied to the induction target 32, 32', 32'', 32'''. In a ZVS-mode the output heating power 34 of an induction target 32, 32', 32'', 32''' increases with a reducing heating current frequency 36. In a ZCS-mode the output heating power 34 of an induction target 32, 32', 32'', 32''' reduces with a reducing heating current frequency 36. The control and/or regulating unit 26 operates the cooking appliance device 10 as an example in the ZVS-mode.

In the continuous heating operating state 50, an energy source supplies the induction targets 32, 32', 32'', 32''' with electrical energy. The energy source is an electrical current phase of a current supply network. The cooking appliance device 10 has at least one inverter unit 38 for providing at least one heating current frequency 36 for the respective induction target 32, 32', 32'', 32''' (cf. FIG. 2).

FIG. 2 illustrates the cooking appliance device 10 having four induction targets 32, 32', 32'', 32' that are defined by a control and/or regulating unit 26 of the cooking appliance device 10. The cooking appliance device 10 has four resonant inverter units 38. The inverter units 38 provide a heating current frequency 36 for the induction targets 32, 32', 32'', 32'''. The inverter units 38 supply the induction targets 32, 32', 32'', 32' with electrical energy independently of one another. Each inverter unit 38 is allocated respectively to one of the induction targets 32, 32', 32'', 32'''. Each inverter unit 38 comprises in FIG. 2 as an example an inverter 64.

The control and/or regulating unit 26 is provided so as in the periodic continuous heating operating state 50, which is allocated one operating period 42, to repetitively control and supply energy to the at least one induction target 32, 32', in particular from the energy source. The control and/or regulating unit 26 is provided so as in the continuous heating operating state 50 to periodically control and supply energy to the induction target 32, 32'. The control and/or regulating unit 26 is provided so as in a switched-on interval 40, 40' of the operating period 42 to operate the induction target 32, 32', 32'', 32''' with a heating power, in particular a desired heating power 30, 30' or excess power with respect to the desired heating power 30, 30'. In particular in the absence of a changed desired heating power 30, 30' that has been set by an operator, the control and/or regulating unit 26 repetitively runs through the operating period 42 for at least one induction target 32, 32', 32'', 32''' in the continuous heating operating state 50.

The cooking appliance device 10 has an electromechanical switching element 60 for each induction target 32, 32', 32'', 32'. The switching element 60 is embodied as a relay 62. The induction targets 32, 32', 32'', 32''' can be connected to the electrical energy supply by the relay 62. The cooking appliance device 10 has in each case one resonance capacitor unit 44 for each induction target 32, 32', 32'', 32'. Each induction target 32, 32', 32'', 32' can be controlled individually with a respective heating current frequency 36.

Figure 3:
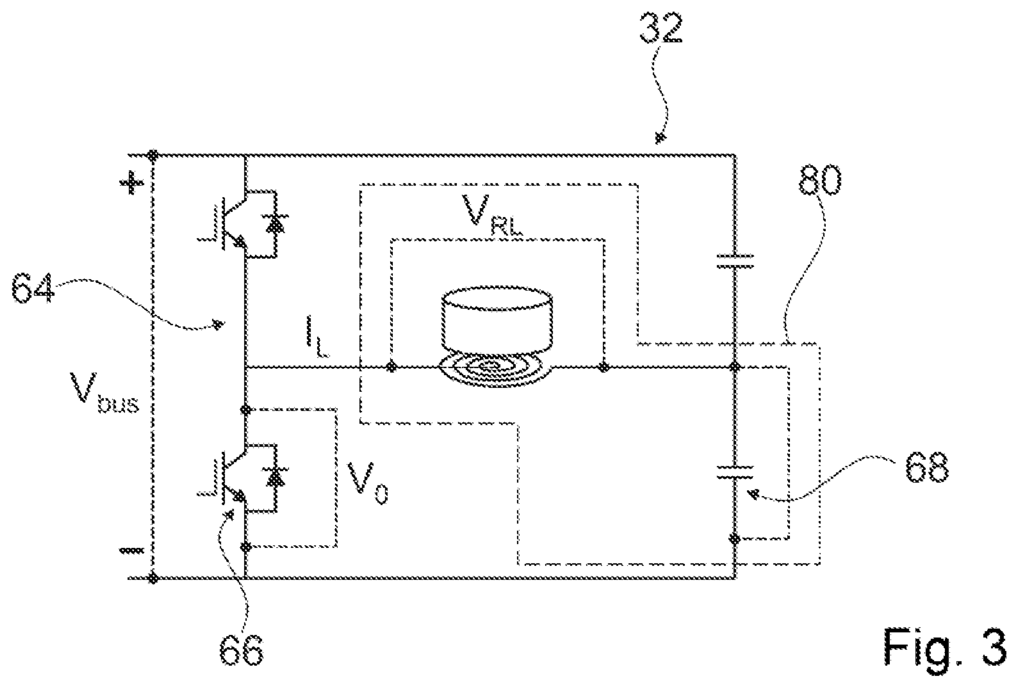
FIG. 3 shows a schematic illustration of a control for one of the induction targets.

FIG. 3 shows a section of FIG. 2 with schematically illustrated voltages vi and currents $i_i$, wherein the subscript i is inserted as a placeholder for the respective reference character. A rectified supply voltage $v_{bus}$ is applied by way of the inverter unit 38, in particular by way of the inverter 64. A voltage $v_0$ is applied by way of one, in particular each, part 66 of the inverter 64. The voltage $v_{RL}$ is applied by way of the inductor 22, in particular the induction target 32. The voltage $v_c$ is applied by way of one, in particular each, capacitor 68 of the resonance capacitor unit 44. The control and/or regulating unit 26 can measure the voltage $v_0$ by way of a part 66 of the inverter 64, in particular the voltages $v_{bus}$, $v_{RL}$, $v_c$. The control and/or regulating unit 26 can measure the current strength $i_L$. The control and/or regulating unit 26 can store measured values. Over each half of a period duration of an alternating voltage supply, in particular period durations during which rectified alternating voltage is supplied, for example 10 ms, the control and/or regulating unit 26 can measure the voltage $v_0$ at least ten times, preferably at least twenty times, particularly preferably at least a hundred times. Over the course of each half of a period duration of an alternating voltage supply, in particular a period duration during which the rectified alternating voltage is supplied, for example 10 ms, the control and/or regulating unit 26 can measure the voltage $v_0$ a maximum of seven hundred and fifty times. The control and/or regulating unit 26 can calculate average values over an arbitrary number N of measured values, in particular for voltages and current strengths. The control and/or regulating unit 26 can perform an error calculation for each calculated average value and/or determine whether an average value is within or outside predetermined error tolerances. If an average value lies outside the error tolerances, it is conceivable that the control and/or regulating unit 26 takes into consideration further values when calculating an average, in particular until the value is within the error tolerances. It is conceivable that so as to determine an average value the control and/or regulating unit 26 takes into consideration a lower limit and an upper limit for a number N of values by way of inclusion when calculating an average value. In the case of error tolerances not being achieved for an arbitrary value, in particular a calculated average value, within the lower and the upper limit for the number N of values, it is conceivable that the control and/or regulating unit 26 rejects this value for the average calculation and moves ahead so as to determine the next value. The number N is in particular an arbitrary natural number. In the case of unreliable measurements or calculations, the control and/or regulating unit 26 can cease, in particular temporarily, the control, in particular for the heating current frequency 36 of an induction target 32, 32', 32'', 32'''. The unit 80 that has the induction target 32, 32', 32'', 32''' comprises at least one induction target 32, 32', 32'', 32''' and in each case at least one capacitor 68 of the resonance capacitor unit 44, which is connected in series to the induction target 32, 32', 32'', 32'''.

Figure 4A:
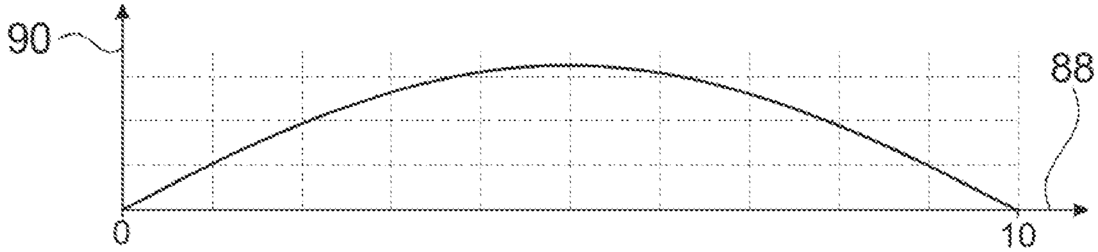
FIGS. 4*a* to 4*c* show exemplary schematic illustrations of the resistance curve and the induction curve of one of the induction targets in an operating period, FIGS. 5*a* and 5*b* schematic illustrations of a distorted supply current in comparison to an ideal supply current and a schematic illustration of the spacing of the individual harmonics of the supply current from corresponding EMC limit values.
Figure 4B:
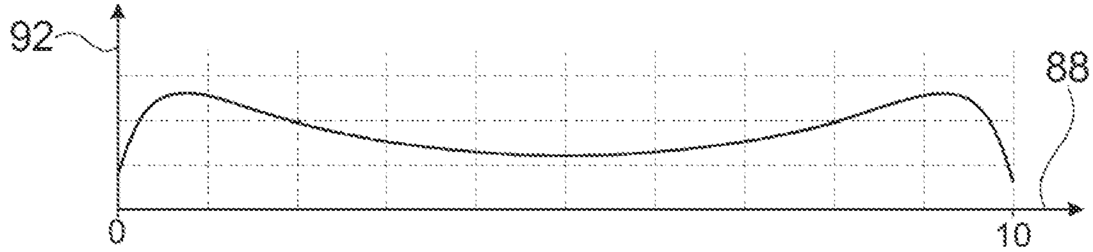
Figure 4C:
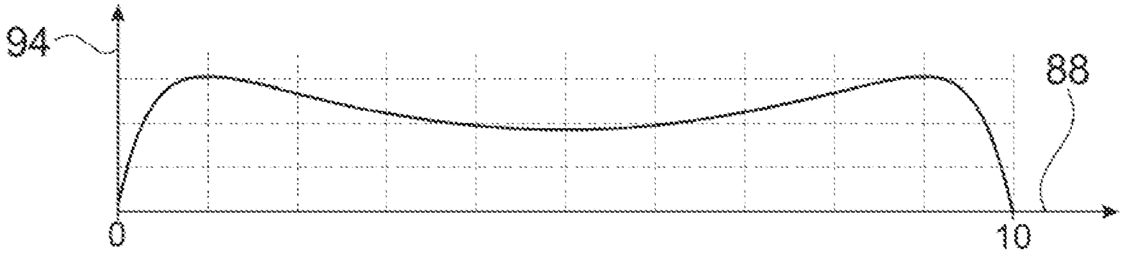

FIG. **4*a* illustrates the curve of the rectified voltage $v_{bus}$ over a period duration, in particular of 10 ms. The time is plotted in milliseconds on an abscissa 88. The rectified voltage $v_{bus}$ is plotted in volts on an ordinate 90. FIGS. 4***b* and 4*c* illustrate how within the period duration of the rectified voltage $v_{bus}$ the resistance, which is plotted in particular on an ordinate 92, (cf. FIG. 4*b*), and the inductivity, which is plotted in particular on an ordinate 94 (cf. FIG. 4*c*) of the controlled induction target 32, 32', 32", 32'" or of a unit 80 that comprises the induction target 32, 32', 32", 32'", vary over time in particular in dependence upon the signal level of the rectified voltage, wherein in particular the time is plotted in milliseconds on the abscissa 88. In particular, as the inductivity varies, an impedance, in particular a complex conductance, of the induction target 32, 32', 32", 32'" also changes within the period duration of the rectified voltage $v_{bus}$. In particular, as the resistance varies, the actual conductance of the induction target 32, 32', 32", 32'" also changes within the period duration of the rectified voltage $v_{bus}$. The control and/or regulating unit 26 is provided so as in the continuous heating operating state 50 to vary a heating current frequency 36 for the induction target 32, 32', 32", 32'" in the switched-on interval 40, 40' of the operating period 42. In the continuous heating operating state 50, the control and/or regulating unit 26 can vary the heating current frequency 36 in particular so as to maintain constant the impedance and/or the actual conductance and/or of the complex conductance of a unit 80 that has the induction target 32, 32', 32", 32'". The control and/or regulating unit 26 is provided so as in the continuous heating operating state 50 to maintain at least one impedance at least of one unit 80 that has the induction target 32, 32', 32", 32'" at least essentially constant within the switched-on interval 40, 40'. The control and/or regulating unit 26 is provided so as in the continuous heating operating state 50 to constantly vary the heating current frequency 36 in the switched-on interval 40, 40'. In particular, the control and/or regulating unit 26 varies the heating current frequency 36 at least ten times in an operating period 42.

Figure 5A:
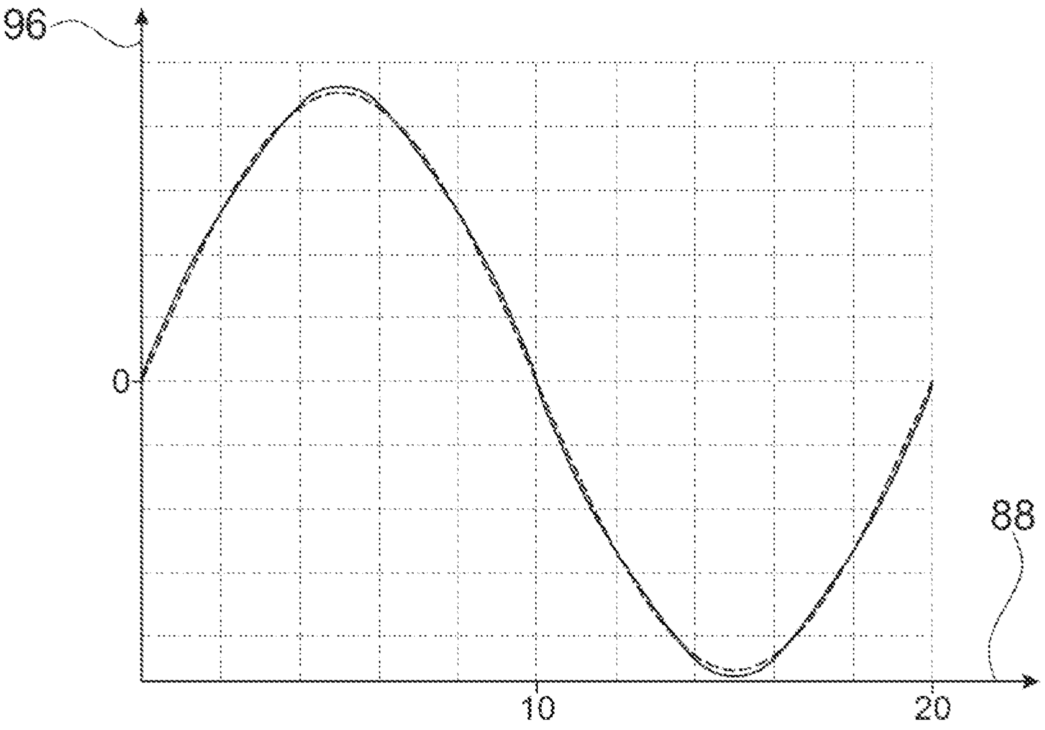
Figure 5B:
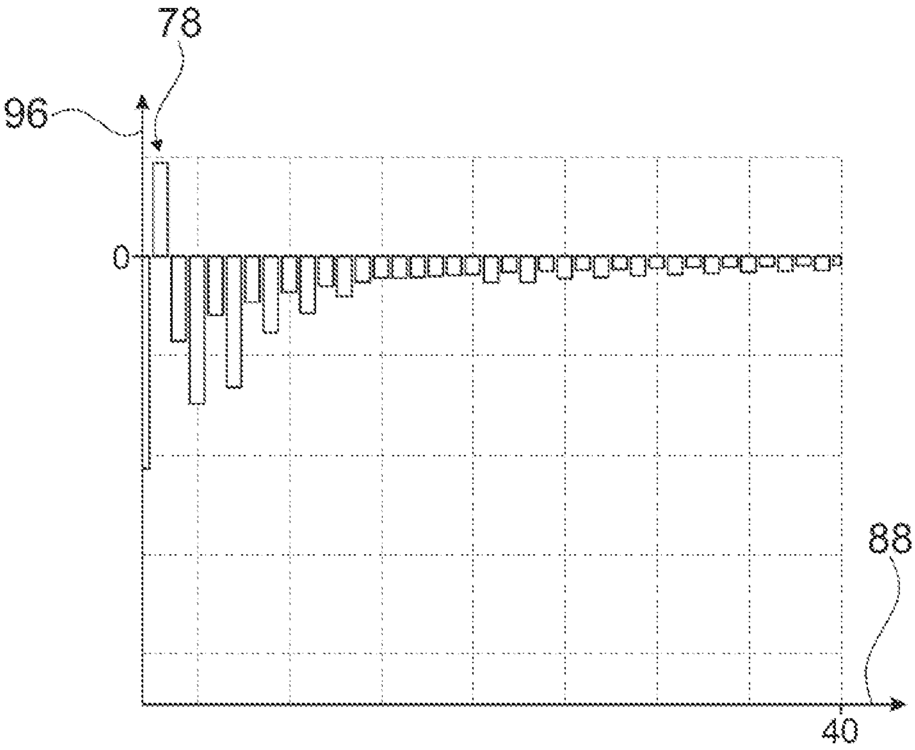

FIGS. 5*a, b* illustrate a distorted alternating current supply in the case of the operation of an induction target 32, 32', 32", 32"" with a constant heating current frequency 36 in the continuous heating operating state 50. In FIG. 5*a*, the time is plotted in milliseconds on the abscissa 88. In FIG. 5*a*, the current strength is plotted in amps on an ordinate 96. FIG. 5*b* illustrates in addition that individual harmonics 78 (harmonics) have a greater amplitude than other harmonics 78, in particular on account of the dependency of the waveform of the supply current on the signal level, in particular on the amplitude, and on the temperature. As a consequence, individual harmonics 78, in this example the third harmonic 78, cannot comply with the EMC standards. FIG. 5*a* illustrates in particular an example of how the alternating current supply is distorted on account of the dependency of the impedance of the unit 80 that has the induction target 32, 32', 32", 32"" on the signal level of the alternating voltage supply. In FIG. 5*b*, the alternating current supply is broken down into its in particular first forty onwards from the second harmonic 78, alternatively also referred to as harmonics, wherein each harmonic 78 has a specific current strength and for each harmonic 78 a current strength limit applies that is laid down in particular by EMC standards. In FIG. 5*b*, the order of the harmonics is plotted without a unit on an abscissa 98. In FIG. 5*b*, the current strengths, in particular the difference of the current strengths, is plotted in amps on the ordinate 96. In FIG. 5*b*, in particular the differences of the current strengths of the individual harmonics 78 are plotted after the second order up to their limits, wherein a positive difference indicates that the value is not within the limit. For example, it is illustrated that the third harmonic 78, for example of 2.77 A, lies above its limit, wherein the limit is in particular 2.3 A, and the EMC standards are not complied with. In this example, the induction target 32, 32', 32", 32"" is controlled and operated with a constant heating current frequency 36 of 60 kHz.

Figure 6A:
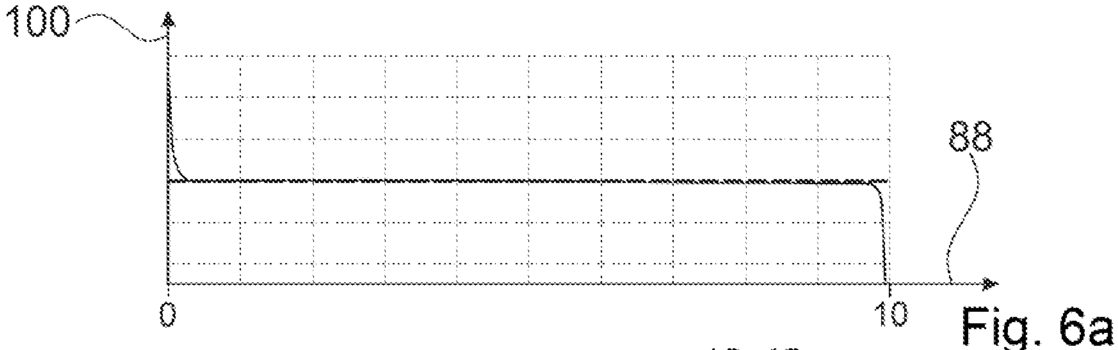
FIGS. 6*a* to 6*e* show schematic illustrations of a control with a frequency spread and the actual conductance for one of the induction targets being maintained constant.
Figure 6B:
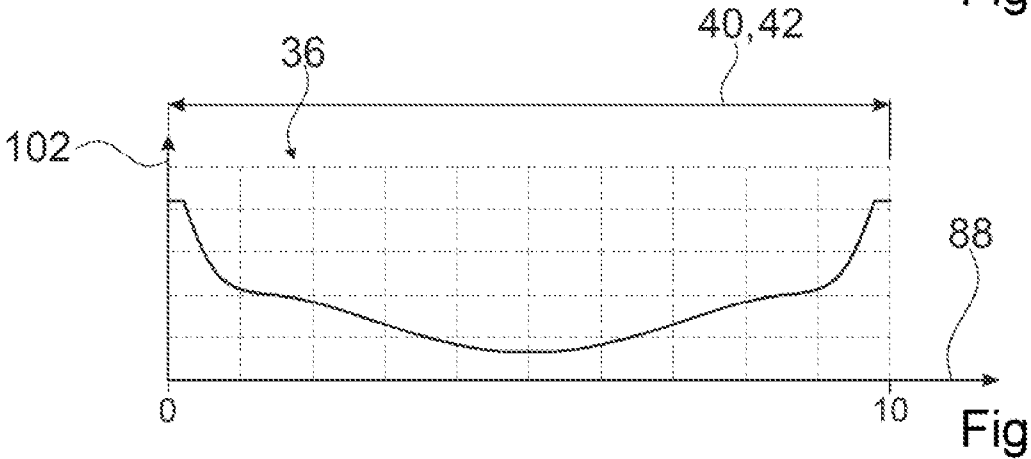

FIGS. 6*a* to 6*e* illustrate schematically a curve of a control for an induction target 32, 32', 32", 32'" performed by the control and/or regulating unit 26. The control and/or regulating unit 26 is provided so as in the continuous heating operating state 50 to maintain at least the actual conductance at least of the unit 80 that has the induction target 32, 32', 32", 32"" in particular essentially constant within the switched-on interval 40, 40'. In the continuous heating operating state 50, the control and/or regulating unit 26 maintains at least the actual conductance of the unit 80 that has the induction target 32, 32', 32", 32'" essentially constant within the switched-on interval 40, 40'. FIG. 6*a* illustrates the curve of the actual conductance G of the unit 80 that has the induction target 32, 32', 32", 32"" in the operating period 42, for example 10 ms, corresponding to half a period duration of the alternating voltage supply. In FIG. 6*a*, the time is plotted in milliseconds on the abscissa 88. In FIG. 6*a*, the actual conductance is plotted in ($m\Omega^{-1}$), in particular $milliohm^{-1}$, on an ordinate 100. FIG. 6*b* illustrates in the same operating period 42 of the heating current frequency 36 the curve that is required so as to maintain the actual conductance G constant and is achieved by the control and/or regulating unit 26. In FIG. 6*b*, the time is plotted in milliseconds on the abscissa 88. In FIG. 6*b*, the frequency is plotted in kHz on an ordinate 102. In particular, the control and/or regulating unit 26 changes the heating current frequency 36, in particular of the induction target 32, 32', 32", 32"", in particular at least five times per millisecond. It is illustrated that the control and/or regulating unit 26 can control the heating current frequency 36 at times without any changes. The control and/or regulating unit 26 controls and/or regulates the heating current frequency 36 to a constant value in the first and last approximately 0.2 milliseconds of the operating period 42. In particular, the control and/or regulating unit 26 can determine measurement data outside error tolerances and therefore avoid an adjustment of the heating current frequency 36.

Figure 6C:
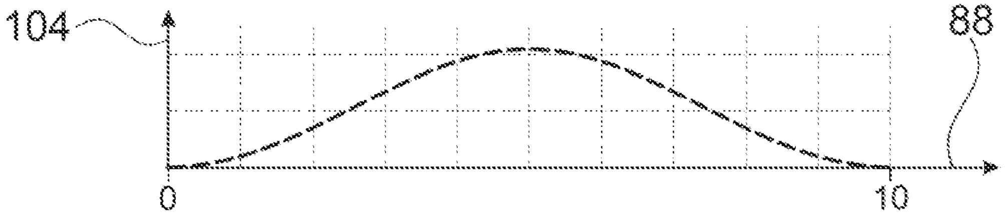
Figure 6D:
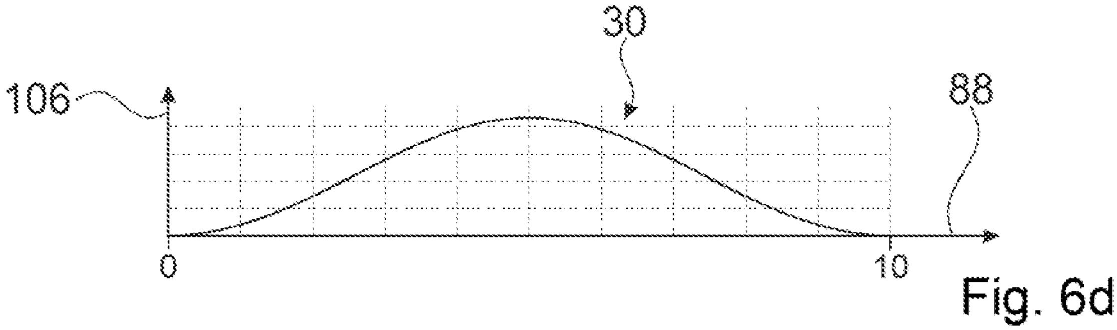
Figure 6E:
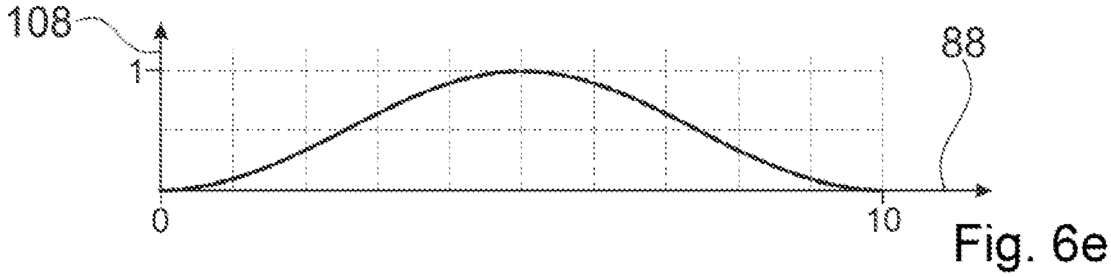

FIG. 6*c* illustrates the curve of the squared rectified alternating voltage supply $v_{bus}$ in the operating period 42. In FIG. 6*c*, the time is plotted in milliseconds on the abscissa 88. In FIG. 6*c*, the squared voltage is plotted in $mV^2$, in particular millivolt, on an ordinate 104. FIG. 6*d* illustrates the curve of the heating power that is achieved, in particular required by the unit 80 that has the induction target 32, 32', 32", 32", in particular by the induction target 32, 32', 32", 32'", in the operating period 42. In FIG. 6*d*, the time is plotted in milliseconds on the abscissa 88. In FIG. 6*d*, the power is plotted in W, in particular watts, on an ordinate 106. In FIG. 6*e*, the curves shown in FIGS. 6*c* and 6*d* are standardized and illustrated placed over one another. In the ideal case of a constant actual conductance, the power is proportional to the square of the voltage and both curves that are illustrated in FIG. 6*e* should fall precisely on top of each another (cf. the following equation).

$$P=U^2\cdot G$$

wherein P is a power, U is a voltage and G is the actual conductance. In FIG. 6*e*, the time is plotted in milliseconds on the abscissa 88. In FIG. 6*e*, a standardizing variable is plotted without units on an ordinate 108. FIG. 6*e* illustrates that the control and/or regulating unit 26 controls and/or regulates the actual conductance so as to achieve a match between the curves of the squared rectified alternating voltage supply $v_{bus}$ and of the power, in particular the heating power, which arises by way of the unit 80 that has the induction target 32, 32', 32'', 32'''. By maintaining constant the actual conductance of the unit 80 that has the induction target 32, 32', 32'', 32''', the control and/or regulating unit 26 reduces the distortion of the supply current. The control and/or regulating unit 26 achieves compliance with EMC standards by maintaining constant the actual conductance, in particular the actual conductance of the unit 80 that has the induction target 32, 32', 32'', 32'''. In particular, the value of the complex conductance, to which the complex conductance is maintained constant by the control and/or regulating unit 26 in the operating period 42, is the desired heating power 30, 30' that is desired in particular by an operator.

Figure 7A:
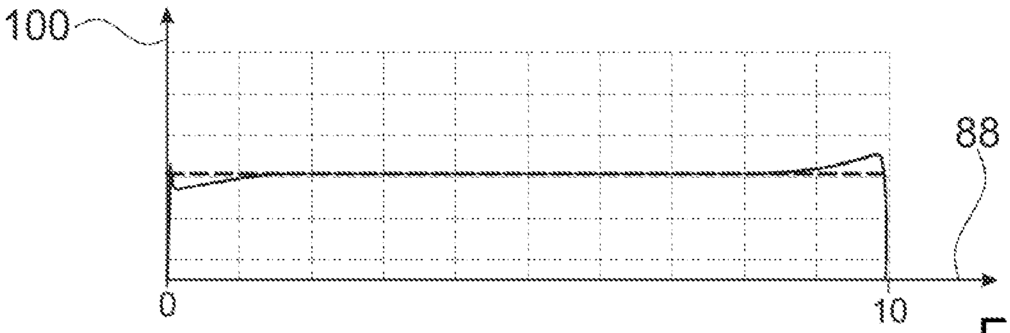
FIGS. 7*a* to 7*e* show schematic illustrations of a control with a frequency spread and the actual conductance constant for one of the induction targets being maintained constant.
Figure 7B:
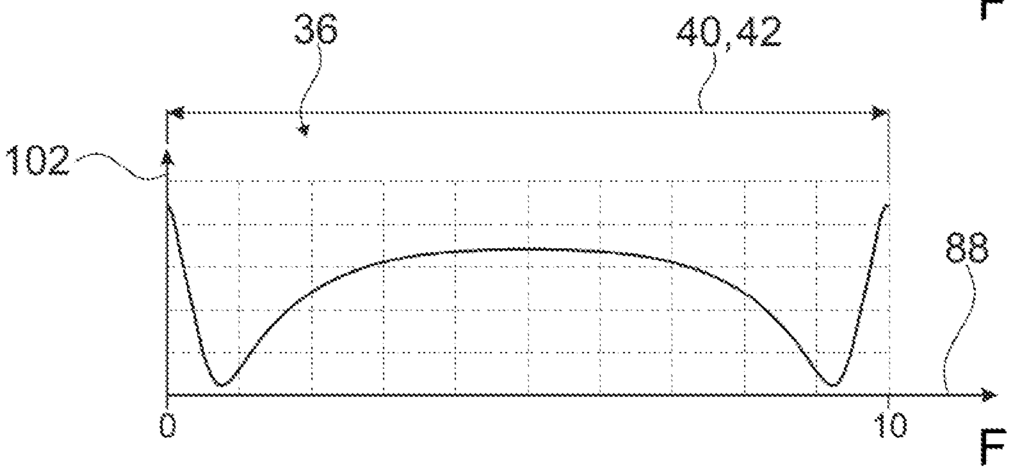
Figure 7C:
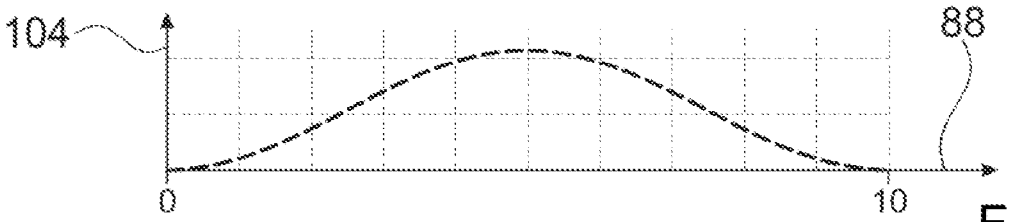
Figure 7D:
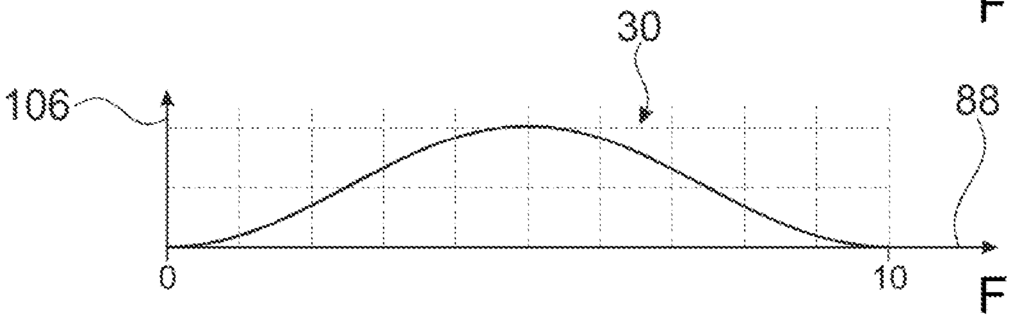
Figure 7E:
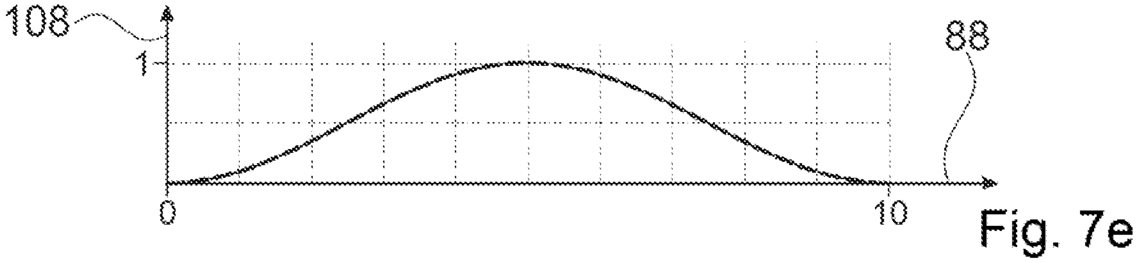

FIGS. 7*a* to 7*e* illustrate schematically a curve of a control for the induction target 32, 32', 32'', 32'''' performed by the control and/or regulating unit 26. In FIGS. 7*a* to 7*e*, the time is plotted in milliseconds on the abscissa 88. In FIG. 7*a*, the actual conductance is plotted in ($m\Omega^{-1}$), in particular milliohm$^{-1}$ on the ordinate 100. In FIG. 7*b*, the frequency is plotted in kHz on the ordinate 102. In FIG. 7*c*, the squared voltage is plotted in $mV^2$, in particular millivolt$^2$, on the ordinate 104. In FIG. 7*d*, the power is plotted in W, in particular in watts, on the ordinate 106. In FIG. 7*e*, a standardizing variable is plotted without units on the ordinate 108.

The control and/or regulating unit 26 is provided so as in the continuous heating operating state 50 to maintain at least the actual conductance (G), at least of the unit 80 that has the induction target 32, 32', 32'', 32''' in particular essentially constant within the switched-on interval 40, 40'. In the continuous heating operating state 50, the control and/or regulating unit 26 maintains at least the actual conductance of the unit 80 that has the induction target 32, 32', 32'', 32''' essentially constant within the switched-on interval 40,40'. FIG. 7*a* illustrates the curve of the actual conductance G of the unit 80 that has the induction target 32, 32', 32'', 32''' in the operating period 42, for example 10 ms, corresponding to a half period duration of the alternating voltage supply. FIG. 7*b* illustrates in the same operating period 42 the curve of the heating current frequency 36 that is necessary in order to maintain the actual conductance G constant and is achieved by the control and/or regulating unit 26. In particular, the control and/or regulating unit 26 changes the heating current frequency 36, in particular of the induction target 32, 32', 32'', 32''' at least ten times per millisecond. It is illustrated that the control and/or regulating unit 26 can control the heating current frequency 36 at times without any changes. The control and/or regulating unit 26 controls and/or regulates the heating current frequency 36 to different values in the first and last approximately 0.2 milliseconds of the operating period 42. In particular, the control and/or regulating unit 26 can determine measurement data within error tolerances and therefore control and/or regulate an adjustment of the heating current frequency 36.

FIG. 7*c* illustrates the curve of the squared rectified alternating voltage supply $v_{bus}$ in the operating period 42. FIG. 7*d* illustrates the curve of the heating power that is achieved, in particular consumed, by the unit 80 that has the induction target 32, 32', 32'', 32''', in particular by the induction target 32, 32', 32'', 32''', in the operating period 42. In FIG. 7*e*, the curves shown in FIGS. 7*c* and 7*d* are illustrated standardized and placed above one another. FIG. 7*e* illustrates that the control and/or regulating unit 26 controls and/or regulates the actual conductance so as to achieve a match between the curves of the squared rectified alternating current supply $v_{bus}$ and of the power, in particular heating power, which arises by way of the unit 80 that has the induction target 32, 32', 32'', 32'''. By maintaining constant the actual conductance of the unit 80 that has the induction target 32, 32', 32'', 32''', the control and/or regulating unit 26 reduces the distortion of the supply current. The control and/or regulating unit 26 achieves compliance with EMC standards by maintaining constant the actual conductance, in particular the actual conductance of the unit 80 that has the induction target 32, 32', 32'', 32'''. In particular, the value of the complex conductance, to which the complex conductance is maintained constant by the control and/or regulating unit 26 in the operating period 42, is the desired heating power 30, 30' that is desired in particular by an operator.

Figure 8A:
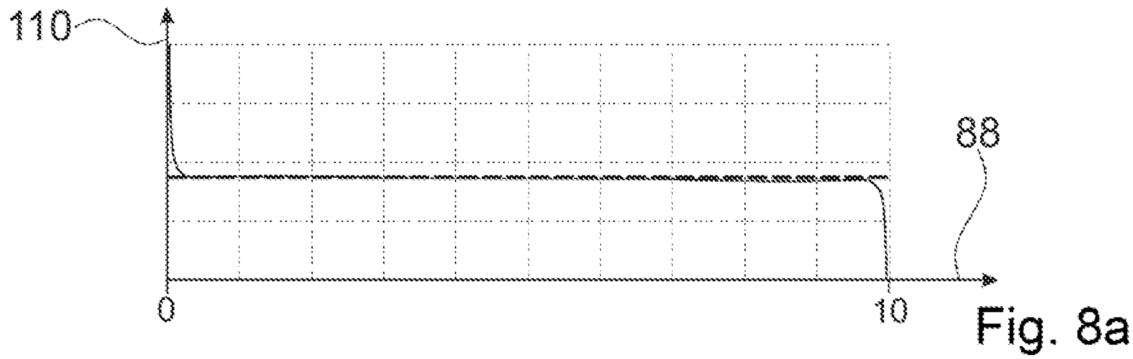
FIGS. 8*a* to 8*e* show schematic illustrations of a control with a frequency spread for one of the induction targets.
Figure 8B:
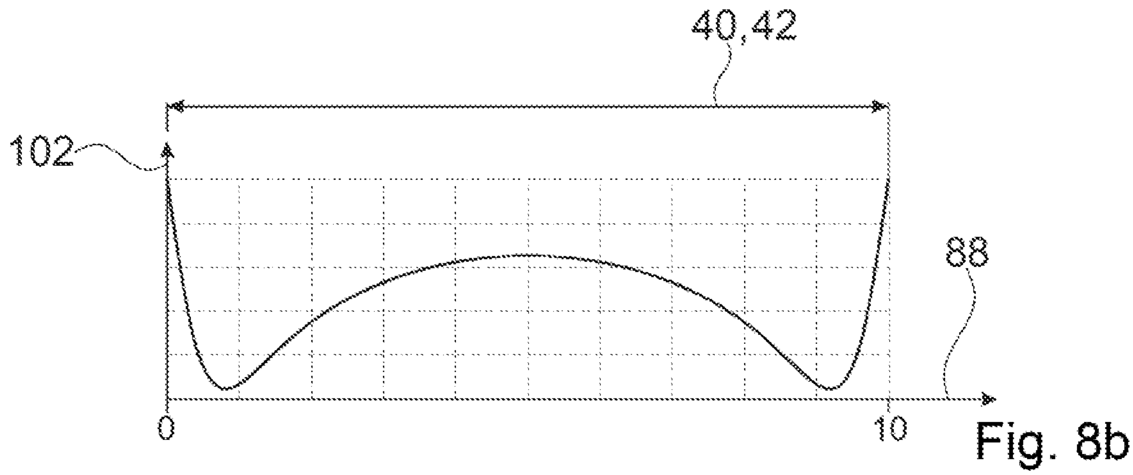
Figure 8C:
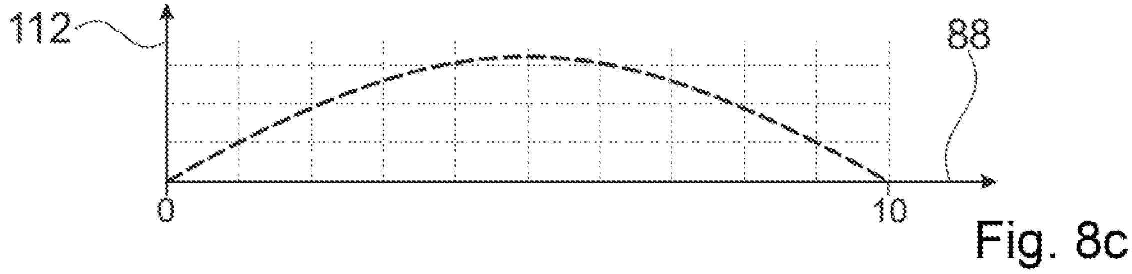
Figure 8D:
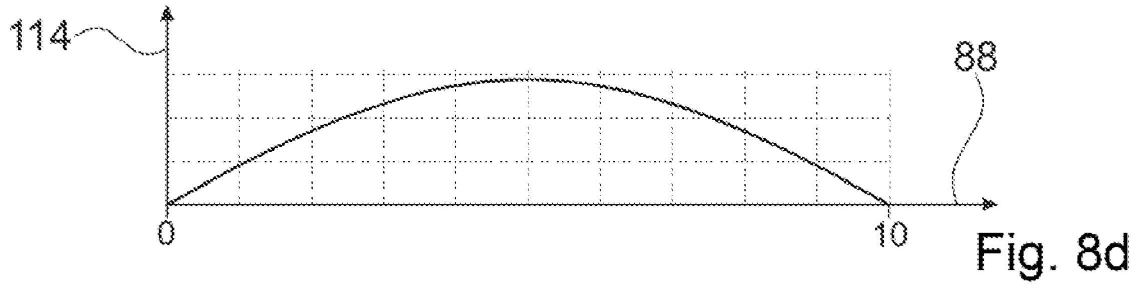
Figure 8E:
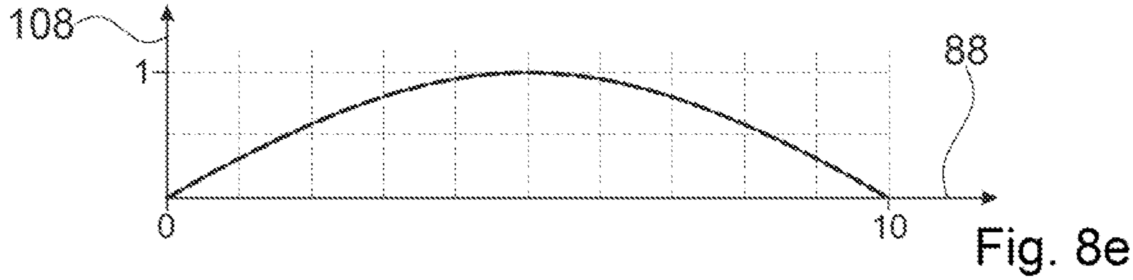

FIGS. 8*a* to 8*e* illustrate schematically a curve of a control for an induction target 32, 32', 32'', 32'''' performed by the control and/or regulating unit 26. The control and/or regulating unit 26 is provided so as in the continuous heating operating state 50 to maintain the complex conductance, at least of the unit 80 that has the induction target 32, 32', 32'', 32''', in particular essentially constant within the switched-on intervals 40, 40'. In FIGS. 8*a* to 8*e*, the time is plotted in milliseconds on the abscissa 88. In FIG. 8*a*, the complex conductance is plotted in ($m\Omega^{-1}$), in particular milliohm$^{-1}$, on an ordinate 110. In FIG. 8*b*, the frequency is plotted in kHz on the ordinate 102. In FIG. 8*c*, the voltage is plotted in V, in particular volts, on the ordinate 112. In FIG. 8*d*, the current strength is plotted in A, in particular in amps, on the ordinate 114. In FIG. 8*e*, a standardizing variable is plotted without units on the ordinate 108.

In the continuous heating operating state 50, the control and/or regulating unit 26 maintains the complex conductance of a unit 80 that has the induction target 32, 32', 32'', 32''' essentially constant within the switched-on interval 40, 40' (cf. FIG. 8*a*). FIG. 8*a* illustrates the curve of the complex conductance Y of the unit 80 that has the induction target 32, 32', 32'', 32''' in the operating period 42, for example 10 ms, corresponding to half a period duration of the alternating voltage supply.

FIG. 8*b* illustrates in the same operating period 42 the curve of the heating current frequency 36 that is necessary so as to maintain the complex conductance Y constant and is achieved by the control and/or regulating unit 26. In particular, the control and/or regulating unit 26 changes the heating current frequency 36, in particular of the induction target 32, 32', 32'', 32''', at least five times per millisecond. It is illustrated that the control and/or regulating unit 26 can control the heating current frequency 36 at times without any changes. The control and/or regulating unit 26 controls and/or regulates the heating current frequency 36 to different values in the first and last approximately 0.2 milliseconds of the operating period 42. In particular, the control and/or regulating unit 26 can avoid measurement data outside error tolerances and therefore adjust the heating current frequency 36.

FIG. 8*c* illustrates the curve of the rectified alternating voltage supply $v_{bus}$ in the squared average in the operating period 42. FIG. 8*d* illustrates the curve of the heating current in the squared average, said heating current being applied, in particular consumed, by the unit 80 that has the induction target 32, 32', 32'', 32''', in particular by the induction target 32, 32', 32'', 32''', in the operating period 42. FIG. 8*e* illustrates the curves of the parameters from FIGS. 8*c* and 8*d* standardized and placed above one another.

FIG. 8*e* illustrates that the control and/or regulating unit 26 controls and/or regulates the actual conductance so as to achieve a match between the curves of the squared rectified alternating voltage supply $v_{bus}$ in the squared average and of the current strength $i_L$, in particular of the heating current that is applied to the unit 80 that has the induction target 32, 32', 32'', 32'''. The control and/or regulating unit 26 reduces the distortion of the supply current by maintaining constant the complex conductance of the unit 80 that has the induction target 32, 32', 32'', 32'''. The control and/or regulating unit 26 achieves compliance with EMC standards by maintaining constant the complex conductance, in particular of the actual conductance of the unit 80 that has the induction target 32, 32', 32'', 32'''. In particular, the value of the complex conductance, to which the complex conductance is maintained constant by the control and/or regulating unit 26 in the operating period 42, is the desired heating power 30, 30' that is desired in particular by an operator.

Figure 9A:
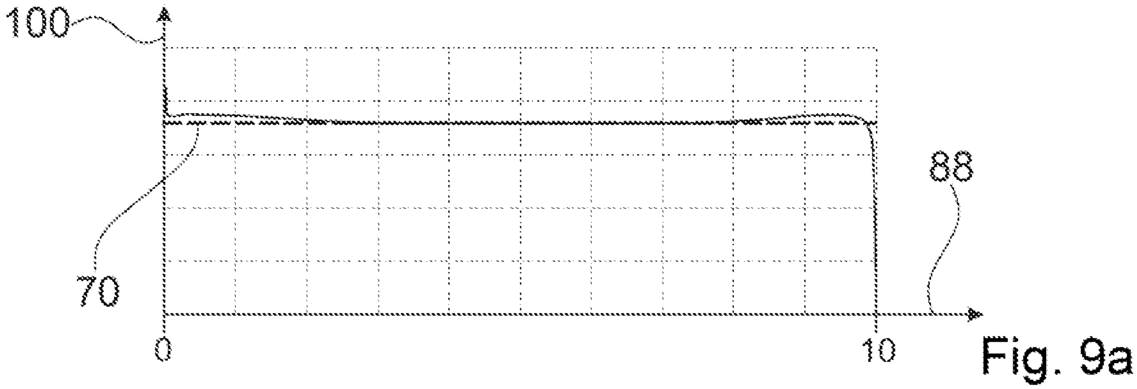
FIGS. 9*a* to 9*d* show schematic illustrations of a control at a maximum frequency and a minimum frequency with respect to the actual conductance for one of the induction targets being maintained constant.
Figure 9B:
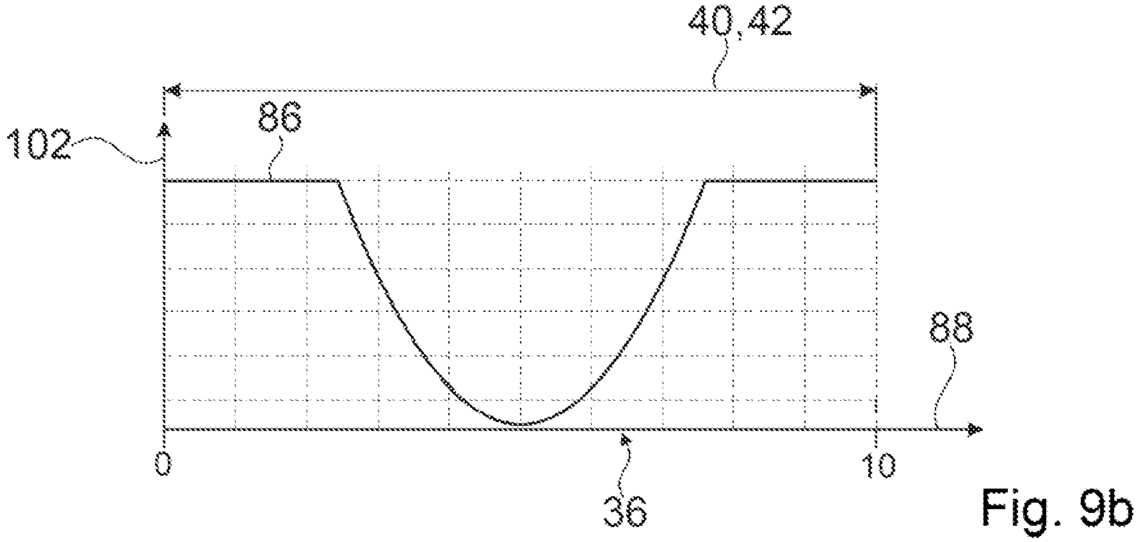
Figure 9C:
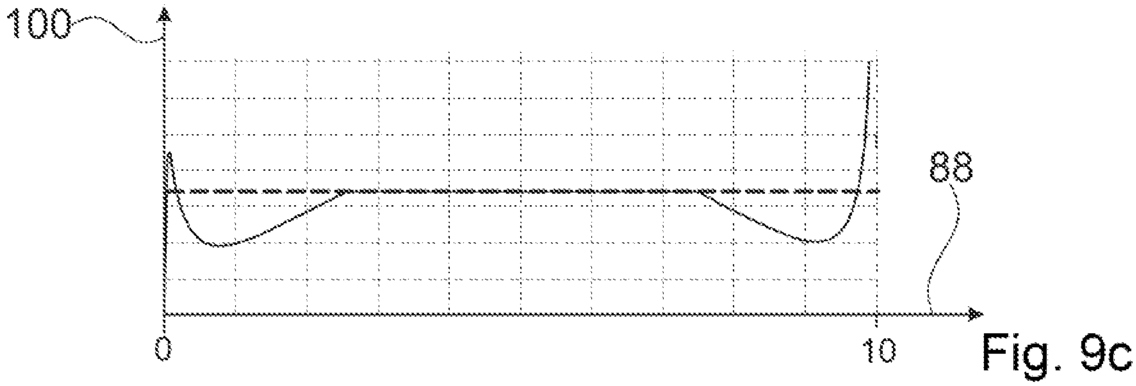
Figure 9D:
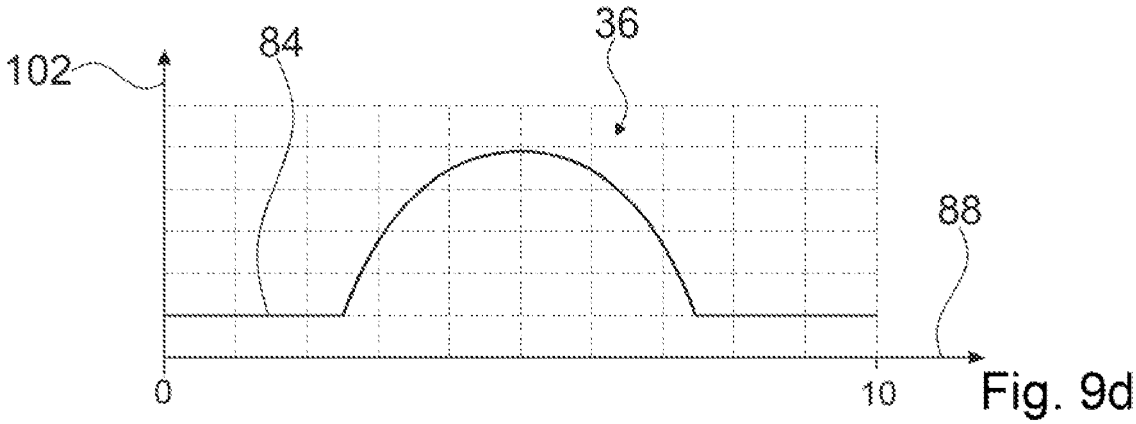

FIGS. 9*a* to 9*d* illustrate schematically a curve of a control for an induction target 32, 32', 32'', 32''' performed by the control and/or regulating unit 26. In FIGS. 9*a* to 9*d*, the time is plotted in milliseconds on the abscissa 88. In FIGS. 9*a* and 9*c*, the actual conductance is plotted in ($m\Omega^{-1}$), in particular milliohm$^{-1}$, on the ordinate 100. In FIGS. 9*b* and 9*d*, the frequency is plotted in kHz on the ordinate 102. The 26 is provided so as in the continuous heating operating state 50 to maintain at least the actual conductance, at least of the unit 80 that has the induction target 32, 32', 32'', 32''', in particular essentially constant within the switched-on interval 40, 40'. In particular, the control and/or regulating unit 26 changes the heating current frequency 36 of the induction target 32, 32', 32'', 32''''. The control and/or regulating unit 26 varies the heating current frequency 36 of the induction target 32, 32', 32'', 32'' ''' within a maximum frequency 82 and a minimum frequency 84 that are permissible according to technical limitations. FIG. 9*a* illustrates a curve of the actual conductance of a unit 80 that has the induction target 32, 32', 32'', 32'''' in the switched-on interval 40, 40', in particular of an operating period 42. FIG. 4*b* illustrates the curve of the heating current frequency 36 that corresponds to FIG. 4*a*. The control and/or regulating unit 26 changes the heating current frequency 36 within the permissible frequency limits, such as a maximum frequency 82 and a minimum frequency 84. The control and/or regulating unit 26 controls and/or regulates the actual conductance on account of a necessary change in the heating current frequency 36 above the maximum frequency 82 in the time interval of 0 to 2.5 ms and from 7.5 ms to 10 ms of the operating period 42 to a constant value, in particular to the maximum frequency 82 (cf. FIGS. 4*a* and 4*b*).

FIG. 9*c* illustrates a curve of the actual conductance of a unit 80 that has the induction target 32, 32', 32'', 32''' in the switched-on interval 40, 40' in particular of an operating period 42. FIG. 4*d* illustrates the curve of the heating current frequency 36 that corresponds to FIG. 4*c*. The control and/or regulating unit 26 controls and/or regulates the actual conductance on account of a necessary change in the heating current frequency 36 below the minimum frequency 84 in the time interval of 0 to 2.5 ms and from 7.5 ms to 10 ms of the operating period 42 to a constant value, in particular to the minimum frequency 84 (cf. FIGS. 4*c* and 4*d*).

Figure 10A:
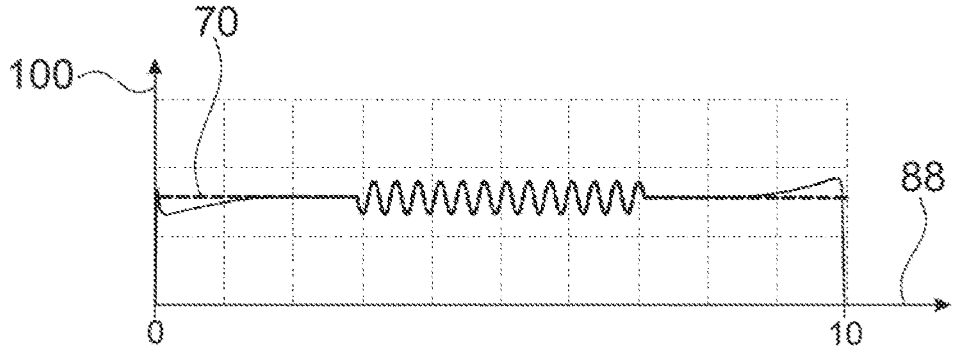
FIGS. 10*a* to 10*e* show schematic illustrations of a control with a frequency spread with the actual conductance for one of the induction targets being maintained constant.
Figure 10B:
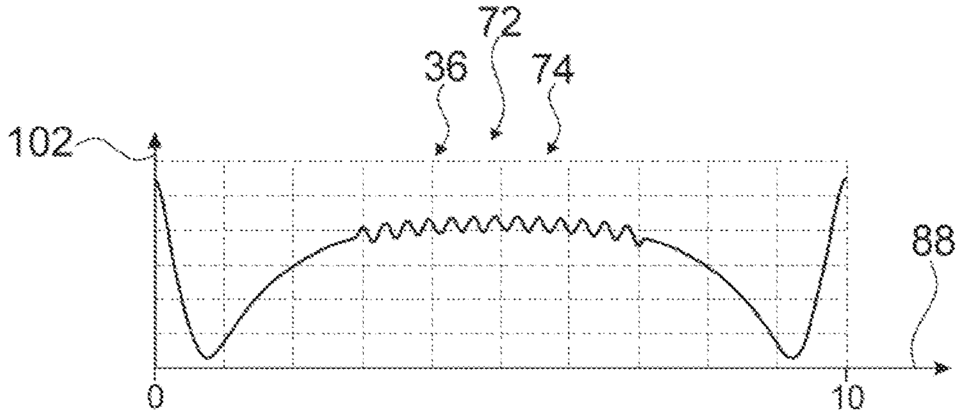
Figure 10C:
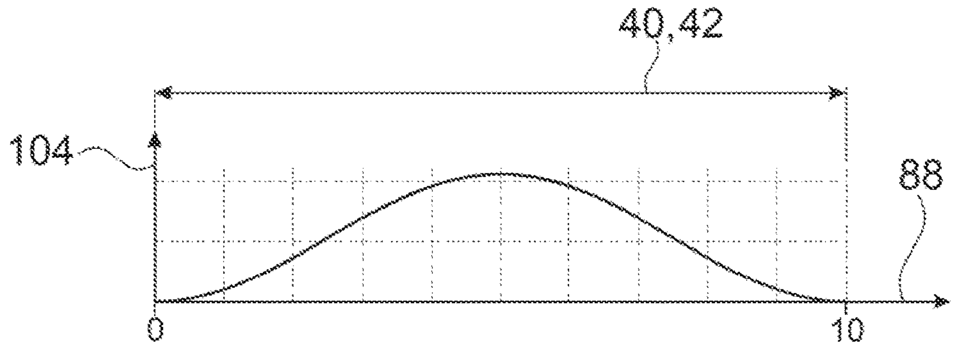
Figure 10D:
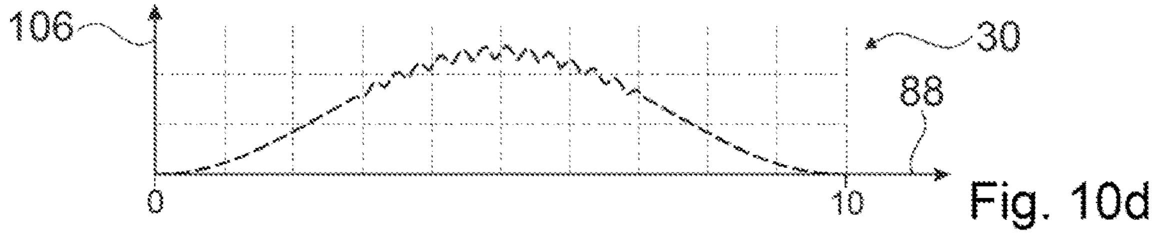
Figure 10E:
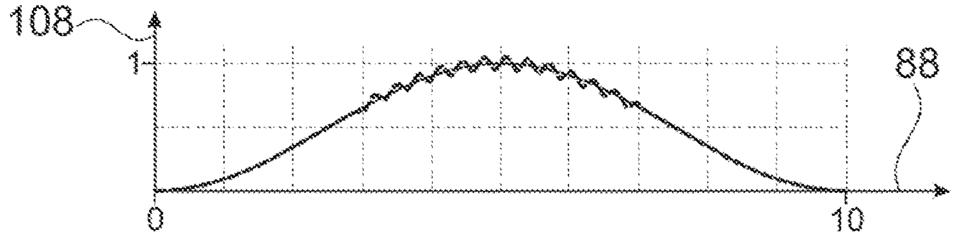

FIGS. 10*a* to 10*e* illustrate schematically a curve of a control for an induction target 32, 32', 32'', 32''' performed by the control and/or regulating unit 26 as shown in FIGS. 7*a* to 7*e* with an additional frequency spread 74. In FIGS. 10*a* to 10*d*, the time is plotted in milliseconds on the abscissa 88. In FIG. 10*a*, the actual conductance is plotted in ($m\Omega^{-1}$), in particular milliohm$^{-1}$ on the ordinate 100. In FIG. 10*b*, the frequency is plotted in kHz on the ordinate 102. In FIG. 10*c*, the squared voltage is plotted in $mV^2$, in particular in millivolts, on the ordinate 104. In FIG. 10*d*, the power is plotted in W, in particular watts, on the ordinate 106. In FIG. 10*e*, a standardizing variable is plotted without units on the ordinate 108.

The control and/or regulating unit 26 is provided so as in the continuous heating operating state 50 to apply a frequency spread 74 by means of a reference curve 70 of the actual conductance of the unit 80 that has the induction target 32, 32', 32'', 32''' to at least one harmonic 78, in particular at least to one of the heating current frequencies 36. The control and/or regulating unit 26 is provided so as in the continuous heating operating state 50 to maintain the actual conductance of the unit 80 that has the induction target 32, 32', 32'', 32''' in particular essentially constant within the switched-on interval 40, 40'. In a middle region 72 of the operating period 42, in particular of 3 ms to 7 ms, the control and/or regulating unit 26 carries out a frequency spread 74 by means of a wavy reference curve 70 for the actual conductance on the heating current frequency 36. The reference curve 70 in order to achieve a frequency spread 74 has a sinusoidal curve. The reference curve 70 is constant outside the middle region 72, in particular corresponds to the reference curve 70 outside the middle region 72 of a temporally constant function. In particular for the duration of the entire operating period 42, in particular at least for the duration of the switched-on intervals 40, 40' of an operating period, the reference curve 70 is centered around the value of the actual conductance at which the induction target 32, 32', 32'', 32''' achieves the desired heating power 30, 30'. In the middle, the control and/or regulating unit 26 achieves in the induction target 32, 32', 32'', 32''' for the duration of the frequency spread 74, for example in the middle region 72, in particular also for the duration of the operating period 42 having a frequency spread 74 the desired heating power 30, 30', in particular the heating current frequency 36 that the control and/or regulating unit 26 maintains constant during the remainder of the operating period 42. In the continuous heating operating state 50, the control and/or regulating unit 26 maintains at least the actual conductance of the unit 80 that has the induction target 32, 32', 32'', 32''' essentially constant within the switched-on interval 40, 40' outside the middle region 72. FIG. 10*a* illustrates the curve of the actual conductance G of the unit 80 that has the induction target 32, 32', 32'', 32''' in the operating period 42, for example 10 ms, corresponding to a half period duration of the alternating voltage supply. FIG. 10*b* illustrates in the same operating period 42 the curve of the heating current frequency 36 that is required so as to maintain the actual conductance G constant and is achieved by the control and/or regulating unit 26. In particular, the control and/or regulating unit 26 changes the heating current frequency 36, in particular of the induction target 32, 32', 32'', 32''', at least five times per millisecond. In particular, the control and/or regulating unit 26 controls and/or regulates the heating current frequency 36 outside the middle region 72 of the switched-on interval 40, 40' so as to achieve a constant actual conductance. In particular, the constant actual conductance is predetermined outside the middle region 72 by means of a constant reference curve 70. In particular, the switched-on interval 40, 40' has two regions from 0 ms to 3 ms and from 7 ms to 10 ms outside the middle region 72 from 3 ms to 7 ms. In particular, the control and/or regulating unit 26 controls and/or regulates the heating current frequency 36 for 6 ms in order to achieve a constant actual conductance and for 4 ms to create a sinusoidal curve of the actual conductance. FIG. 10*c* illustrates the curve of the squared rectified alternating voltage supply $v_{bus}$ in the operating period 42. FIG. 10*d* illustrates the curve of the heating power that is achieved, in particular consumed, by the unit 80 that has the induction target 32, 32', 32'', 32''', in particular by the induction target 32, 32', 32'', 32''', in the operating period 42. In FIG. 10*e*, the curves of the FIGS. 10*c* and 10*d* are illustrated standardized and placed over one another. FIG. 10*e* illustrates that the control and/or regulating unit 26 controls and/or regulates the actual conductance, in particular the heating current frequency 36, so as to achieve a match between the curves of the squared rectified alternating voltage supply $v_{bus}$ and of the power, in particular the heating power, which arises by way of the unit 80 that has the induction target 32, 32', 32'', 32'''. By maintaining constant the actual conductance of the unit 80 that has the induction target 32, 32', 32'', 32''', the control and/or regulating unit 26 reduces the distortion of the supply current. In addition by virtue of the frequency spread 74, the control and/or regulating unit 26 achieves compliance with EMC standards for critical heating current frequencies 36 (cf. FIG. 14) by maintaining constant the actual conductance, in particular the actual conductance of the unit 80 that has the induction target 32, 32', 32'', 32'''. In particular, the value of the complex conductance, to which the complex conductance is maintained constant by the control and/or regulating unit 26 in the operating period 42, is the desired heating power 30, 30' that is desired in particular by an operator. It is conceivable that the control and/or regulating unit 26 extends the region of the operating period 42 with a frequency spread 74 by a wavy reference curve 70 for the duration of the entire operating period 42. It is likewise conceivable that the control and/or regulating unit 26 has at least two regions with a frequency spread 74 distributed in the operating period 42.

Figure 11A:
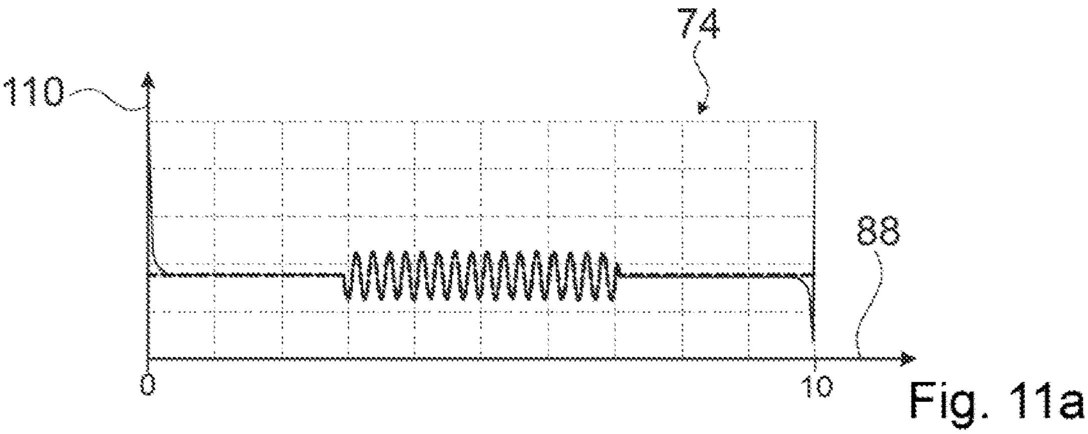
FIGS. 11*a* to 11*e* show schematic illustrations of a control with a frequency spread with the complex conductance for one of the induction targets being maintained constant.
Figure 11B:
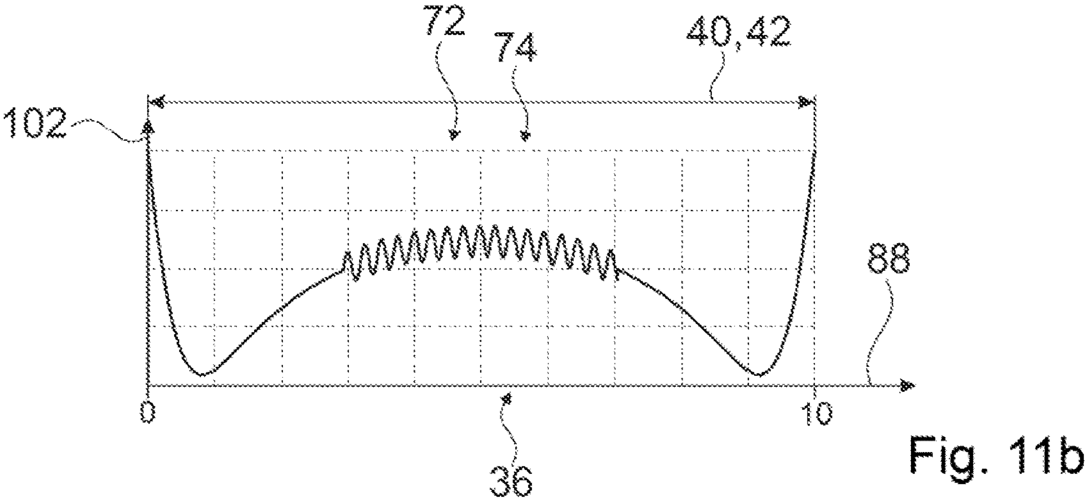
Figure 11C:
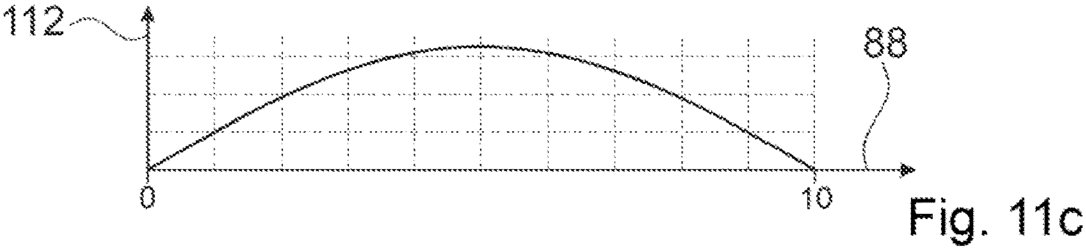
Figure 11D:
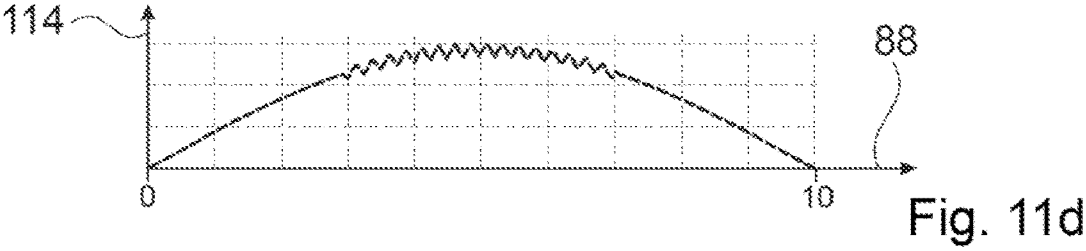
Figure 11E:
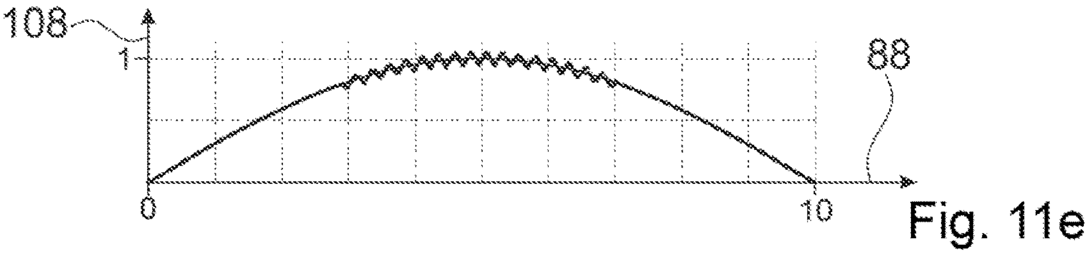

FIGS. 11*a* to 11*e* illustrate schematically a curve of a control for an induction target 32, 32', 32'', 32''' performed by the control and/or regulating unit 26 as in FIGS. 8*a* to 8*e* with an additional frequency spread 74 in a similar manner to the combination which is described in FIG. 10, wherein the control and/or regulating unit 26 controls the frequency spread 74 by means of a reference curve 70 for the complex conductance. In FIGS. 11*a* to 11*d*, the time is plotted in milliseconds on the abscissa 88. In FIG. 11*a*, the complex conductance is plotted in ($m\Omega^{-1}$), in particular in milliohm$^{-1}$, on the ordinate 110. In FIG. 11*b*, the frequency is plotted in kHz on the ordinate 102. In FIG. 11*c*, the voltage is plotted in V, in particular in volts, on the ordinate 112. In FIG. 11*d*, the current strength is plotted in A, in particular in amps, on the ordinate 114. In FIG. 11*e*, a standardizing variable is plotted without units on the ordinate 108.

In particular, the control and/or regulating unit 26 is provided so as in the continuous heating operating state 50 to apply a frequency spread 74 by means of a reference curve 70 of the complex conductance at least of a unit 80 that has the induction target 32, 32', 32'', 32'''' to at least one harmonic 78, in particular at least one of the heating current frequencies 36. The control and/or regulating unit 26 achieves the frequency spread 74 by means of a reference curve 70 in a similar manner to the example of FIGS. 10*a* to 10*e*, wherein the reference curve 70 applies for the complex conductance. It is conceivable that the control and/or regulating unit 26 is provided so as in the continuous heating operating state 50 to control and/or to regulate the heating current frequency 36 by a target frequency, in particular with the aid of a reference curve 70 with tolerances, in particular in order to achieve the desired heating power 30, 30' in the induction target 32, 32', 32'', 32'' ''' for the duration of the operating period 42.

Figure 12A:
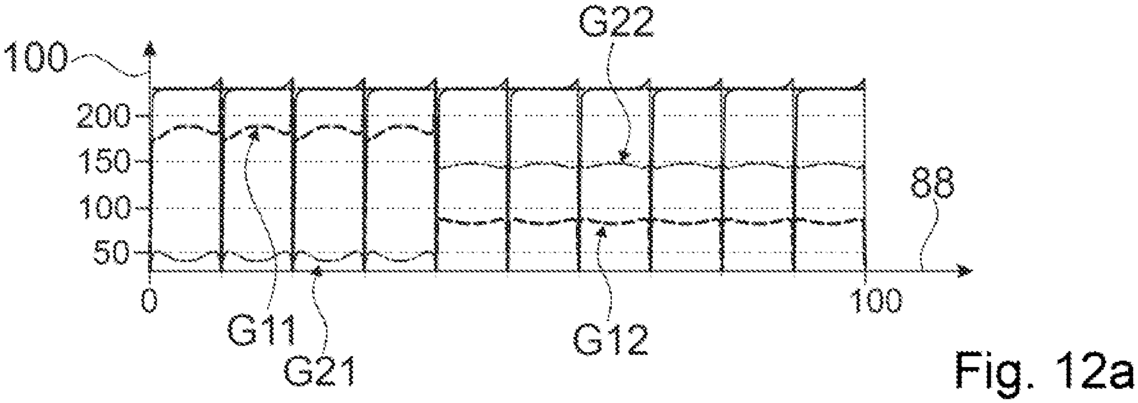
FIGS. 12*a* to 12 show schematic illustrations of a control with respect to a low-noise operation with the actual conductance for two of the induction targets being maintained constant.
Figure 12B:
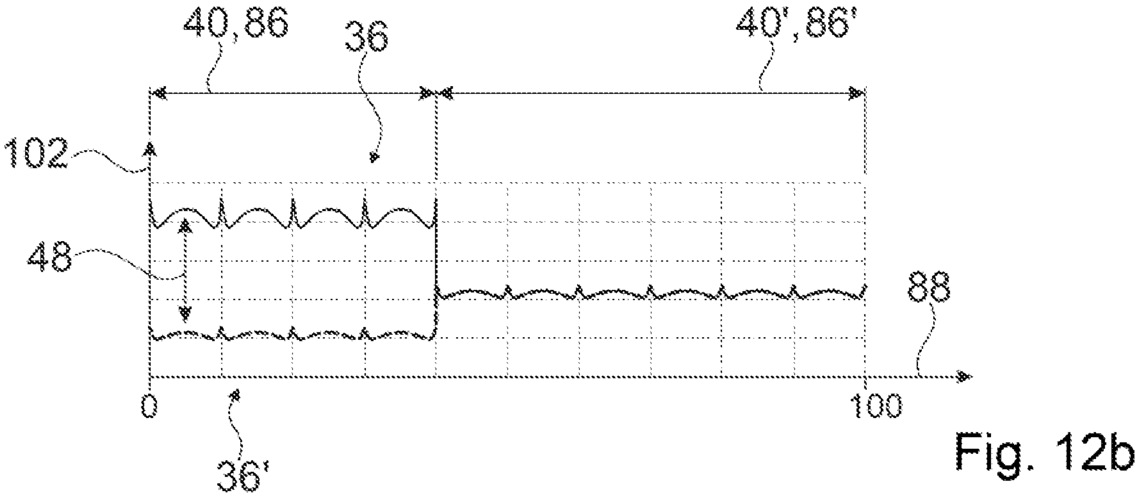
Figure 12C:
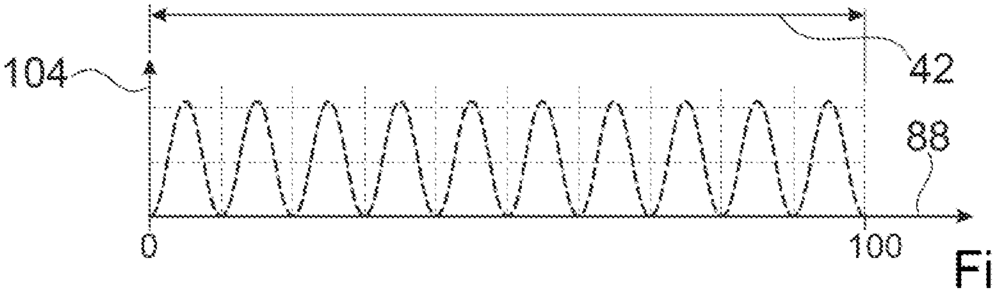
Figure 12D:
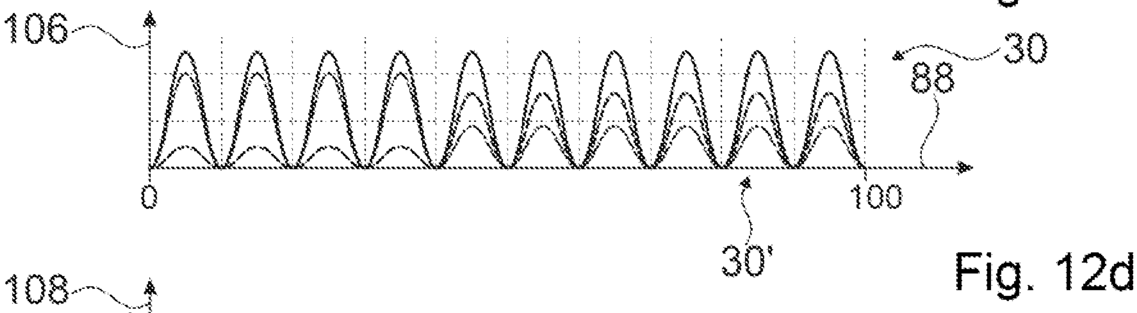
Figure 12E:
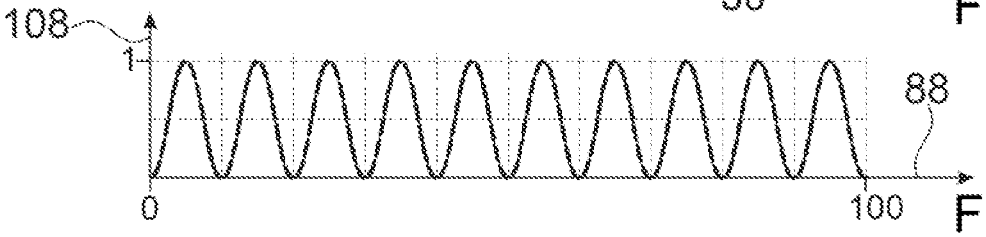

FIGS. 12*a* to 12*e* illustrate schematically a curve of a noise-free control for two units 80 that have an induction target 32, 32', 32'', 32''' performed by the control and/or regulating unit 26. In FIGS. 12*a* to 12*d*, the time is plotted in milliseconds on the abscissa 88. In FIG. 12*a*, the actual conductance is plotted in ($m\Omega^{-1}$), in particular in milliohm$^{-1}$, on the ordinate 100. In FIG. 12*b*, the frequency is plotted in kHz on the ordinate 102. In FIG. 12*c*, the squared voltage is plotted in $mV^2$, in particular in millivolt$^2$, on the ordinate 104. In FIG. 12*d*, the power is plotted in W, in particular in watts, on the ordinate 106. In FIG. 12*e*, a standardizing variable is plotted without units on the ordinate 108.

In the illustrated example, the operating period 42 corresponds to a multiplicity, in particular ten, of the halves of the period duration of the alternating voltage supply, in particular of the period duration of the rectified alternating current supply. The operating period 42 has for example a duration of 10 ms. FIG. 12*a* illustrates the respective curves of the actual conductance for each of the two units 80 that have an induction target 32, 32', 32'', 32''' and the sum of the actual conductances of the two units 80 that have an induction target 32, 32', 32'', 32''' in an operating period 42, in particular for an operating period 42.

The control and/or regulating unit 26 is provided so as in the continuous heating operating state 50 to repetitively control at least a second induction target 32, 32', 32'', 32''' and to supply said second induction target with energy and to operate the induction target 32, 32', 32'', 32''' in at least one second switched-on interval 86, 86' of the operating period 42 with a heating power, in particular a desired heating power 30, 30' or an excess power with respect to a desired heating power 30, 30'. The control and/or regulating unit 26 is provided so as in the continuous heating operating state 50 to vary a second heating current frequency 36' for the second induction target 32, 32', 32'', 32''' in the second switched-on interval 86, 86' of the operating period 42. The control and/or regulating unit 26 is provided so as in the continuous heating operating state 50 to avoid intermodulation noise at least of two different induction targets 32, 32', 32'', 32'''.

FIG. 12*b* illustrates the respective curves of the heating current frequencies 36 that are controlled by the control and/or regulating unit 26 at the units 80 that have an induction target 32, 32', 32'', 32''', in particular for an operating period 42.

FIG. 12*c* illustrates the respective curves of the squared rectified alternating voltage supply $v_{bus}$ that are controlled by the control and/or regulating unit 26 at the units 80 that have an induction target 32, 32', 32'', 32''', in particular for an operating period 42.

FIG. 12*d* illustrates the respective curves, which are controlled by the control and/or regulating unit 26, of the heating powers that are achieved, in particular consumed, at the units 80 that have an induction target 32, 32', 32'', 32''' and also the curve of the sum of the heating powers, in particular for an operating period 42.

In FIG. 12*e*, the respective curves of FIGS. 12*c* and 12*d* that are controlled by the control and/or regulating unit 26 are standardized and placed above one another. FIG. 12*e* illustrates that the control and/or regulating unit 26 controls and/or regulates the sum of the actual conductance of the controlled units 80 that have an induction target 32, 32', 32'', 32''' so as to achieve a match between the curves of the squared rectified alternating voltage supply $v_{bus}$ and of the sum of the powers, in particular heating powers, that arise by way of the units 80 that have the induction target 32, 32', 32'', 32'''.

By maintaining constant the sum of the actual conductance of the units 80 that have the induction target 32, 32', 32'', 32''', the control and/or regulating unit 26 reduces the distortion of the supply current. The control and/or regulating unit 26 achieves compliance with EMC standards by maintaining constant the sum of the actual conductance, in particular of the actual conductance of the units 80 that have the induction target 32, 32', 32'', 32'''. In particular, the curves of the actual conductance for each unit 80 that has an induction target 32, 32', 32'', 32''' deliver the desired heating power 30, 30' that is desired in particular by an operator.

The control and/or regulating unit 26 can apply the control whilst maintaining constant the actual and/or complex conductances in the switched-on interval 40, 40' of the operating period 42 for one unit 80 that has an induction target 32, 32', 32'', 32''' for multiple units 80 that have an induction target 32, 32', 32'', 32'''.

For example, the mathematical correlations of the control performed by the control and/or regulating unit 26 for multiple units 80 that have an induction target 32, 32', 32'', 32''' are illustrated below.

In order to achieve compliance with EMC standards, the control and/or regulating unit 26 can maintain the sum of the actual conductances of all the units 80 that have an induction target 32, 32', 32'', 32''' essentially constant. The sum of the actual conductance of all units 80 that have an induction target 32, 32', 32'', 32''' is described by the following equation. The control and/or regulating unit 26 can by means of the following equation also calculate the sum of the actual conductances that is associated in each case with a target frequency, in particular a desired heating power 30, 30'.

$$\Sigma G = G_1 + G_2 = \frac{P_1}{v_{0,1rms}^2} + \frac{P_2}{v_{0,2rms}^2}$$

wherein ΣG represents the sum of the actual conductaces. Since all the units 80 that have an induction target 32, 32', 32'', 32''' share the same voltage, in particular $v_{01,rms}{}^2 = v_{02,rms}{}^2$, the control and/or regulating unit 26 can calculate the sum of the actual conductances directly and by way of variations of the heating current frequencies 36 maintain said sum constant over each switched-on interval 40, 40' of each operating period 42. In particular, the control and/or regulating unit 26 can maintain the sum of the actual conductances essentially constant by way of variations of the heating current frequencies 36 of each controlled unit 80 that has an induction target 32, 32', 32'', 32''' over each switched-on interval 40, 40' of each operating period 42, in particular the entire operating period 42, in particular the half of the period duration of the alternating voltage supply. In particular, so as to maintain constant the sum of all the actual conductances, the control and/or regulating unit 26 can control each unit 80 that has an induction target 32, 32', 32'', 32''' individually in a similar manner to the control for only one unit 80 that has an induction target 32, 32', 32'', 32'''.

In order to control multiple units 80 that have an induction target 32, 32', 32'', 32''', the control and/or regulating unit 26 calculates a linear equation system that is described mathematically below:

$$Gx = g;\ G = \begin{bmatrix} G_{11} & G_{12} & \dots & G_{1N} \\ G_{21} & G_{22} & \dots & G_{2N} \\ \dots & \dots & \dots & \dots \\ G_{M1} & G_{M2} & \dots & G_{MN} \end{bmatrix};\ x = \frac{1}{T_{cs}} \begin{bmatrix} t_1 \\ t_2 \\ \dots \\ t_N \end{bmatrix};\ g = \begin{bmatrix} G_{T1} \\ G_{T2} \\ \dots \\ G_{TM} \end{bmatrix}$$

wherein G is the matrix of the actual conductances, x is a vector with the switched-on times $t_i$ and g is a vector with actual conductances $G_{Ti}$ of the units 80 that have an induction target 32, 32', 32'', 32''', said actual conductances corresponding to the desired heating powers.

The columns of the matrix G are the actual conductances for a noiseless modulation for the different induction target 32, 32', 32'', 32''', in particular of the units 80 that have an induction target 32, 32', 32'', 32''' at each switched-on interval 40, 40'. The rows of the matrix G are the actual conductances for in each case an induction target 32, 32', 32'', 32''', in particular a unit 80 that has an induction target 32, 32', 32'', 32''', in each switched-on interval 40, 40'.

The control and/or regulating unit 26 is provided so as to embody at least two time intervals, in particular switched-on intervals 40, 40', in an operating period 42 in the case of the operation of multiple induction targets 32, 32', 32'', 32'''.

The control and/or regulating unit 26 is provided so as in each respective switched-on interval 40, 40' in an operating period 42 to operate in each case one induction target 32, 32', 32'', 32''' with an excess power and another induction target 32, 32', 32'', 32''' with a power deficit with respect to a desired heating power 30, 30'. The control and/or regulating unit 26 is provided so as in each respective switched-on interval 40, 40' in an operating period 42 to operate in each case one induction target 32, 32', 32'', 32''' with a greater actual and/or complex conductance and another induction target 32, 32', 32'', 32''' with a smaller actual and/or complex conductance with respect to an actual and/or complex conductance that corresponds to a desired heating power 30, 30'.

The control and/or regulating unit 26 is provided so as in a further switched-on interval 40, 40' in an operating period 42 to operate in each case the one induction target 32, 32', 32'', 32''' with a power deficit and the other induction target 32, 32', 32'', 32''' with an excess power with respect to a desired heating power 30, 30'.

For the individual switched-on times 40, 40' of an operating period 42, the limitations apply that the sum of all switched-on intervals 40, 40' of an operating period 42 can be a maximum length equal to the operating period 42 itself, wherein each switched-on interval 40, 40' must be greater than/equal to zero.

So as to achieve the noiseless control of multiple units 80 that have an induction target 32, 32', 32'', 32''', the control and/or regulating unit 26 varies the heating current frequencies 36 at each unit 80 that has an induction target 32, 32', 32'', 32''' to a difference 48 of in each case at least 20 kHz, preferably at least 16 kHz or to an infinitesimally small difference 48. FIG. 12 illustrates that an operating period 42 comprises 100 ms. For example, an operating period 42 comprises five period durations of the alternating voltage supply, in particular ten halves of the period duration of the alternating voltage supply.

In each switched-on interval 40, 40', the control and/or regulating unit 26 maintains constant the sum of the respective actual and/or complex conductances, in particular desired conductances, of the units 80 that have an induction target 32, 32', 32'', 32'''. An actual and/or complex desired conductance corresponds in this case to the conductance that corresponds to a desired heating power 30, 30' of the unit 80 that has an induction target 32, 32', 32'', 32'''. The control and/or regulating unit 26 varies in each switched-on interval 40, 40' the heating current frequency 36 at the units 80 that have an induction target 32, 32', 32'', 32''' so as to maintain constant the sum of all actual conductances of the operated units 80 that have an induction target 32, 32', 32'', 32''', for example for two units 80 that have an induction target 32, 32', 32'', 32''' (FIGS. 12*a* and 12*b*).

The operating period 42 has for example two different switched-on intervals 40, 40'. The first switched-on interval 40, 40' goes from 0 ms to 40 ms of the operating period 42 of 100 ms in total. The second switched-on interval 40, 40' goes from 40 ms to 100 ms of the operating period 42 of 100 ms in total.

In this example, in the first switched-on interval 40, 40' of 0 ms to 40 ms of the operating period 42 of 100 ms in total (cf. FIG. 12*a*), the actual conductance $G_{11}$ of a unit 80 that has an induction target 32, 32', 32'', 32''' is approximately 185 $m\Omega^{-1}$. In this example, in the first switched-on interval 40, 40' of 0 ms to 40 ms of the operating period 42 of 100 ms in total (cf. FIG. 12*a*), the actual conductance $G_{21}$ of a further unit 80 that has an induction target 32, 32', 32'', 32''' is approximately 45 $m\Omega^{-1}$.

In this example, in the second switched-on interval 86, 86' of 40 ms to 100 ms of the operating period 42 of 100 ms in total (cf. FIG. 12*a*), the actual conductance $G_{12}$ of the unit 80 that has an induction target 32, 32', 32'', 32''' is approximately 80 $m\Omega^{-1}$. In this example, in the first switched-on interval 40, 40' of 40 ms to 100 ms of the operating period 42 of 100 ms in total (cf. FIG. 12*a*), the actual conductance $G_{22}$ of a further unit 80 that has an induction target 32, 32', 32'', 32''' is approximately 150 $m\Omega^{-1}$.

The control and/or regulating unit 26 maintains constant the sum of the two conductances of approximately 230 $m\Omega^{-1}$ for the entire operating period 42, in particular for the duration of each switched-on interval 40, 40'.

The control and/or regulating unit 26 can determine from the desired heating power 30, 30' for both units 80 that have an induction target 32, 32', 32'', 32''' a corresponding heating current frequency 36 and the actual conductances that match this. The control and/or regulating unit 26 can determine a switched-on interval distribution in the operating period 42 from the actual conductances.

The average conductances that are to be achieved over the duration of the operating period 42 are in this example approximately 122 $m\Omega^{-1}$ for the unit 80 that has an induction target 32, 32', 32'', 32''' and approximately 108 $m\Omega^{-1}$ for the further unit 80 that has an induction target 32, 32', 32'', 32'''.

The control and/or regulating unit 26 controls the heating current frequencies 36 of the units 80 that have an induction target 32, 32', 32'', 32''' to a difference 48 of at least 20 kHz, in particular at least 16 kHz, in this example to a difference 48 of approximately 30 kHz in the first switched-on interval 40, 40'.

The control and/or regulating unit 26 controls the heating current frequencies 36 of the units 80 that have an induction target 32, 32', 32'', 32''' to a difference 48 of at least 0 kHz, in particular to an identical curve, in the second switched-on interval 86, 86' of the operating period 42.

The control and/or regulating unit 26 can perform a variation of the heating current frequencies 36 for maintaining constant the sum of all actual conductances of the units 80 that have an induction target 32, 32', 32'', 32'''. In the case of the variation of at least two simultaneously controlled heating current frequencies 36, the control and/or regulating unit 26 avoids a difference 48 of the heating current frequencies 36 of below 16 kHz, in particular below 20 kHz, so as to maintain constant the sum of all actual conductances of the units 80 that have an induction target 32, 32', 32'', 32'''.

It is conceivable that, so as to maintain said sum constant in the best possible manner, the control and/or regulating unit 26 must correct one heating current frequency 36 to a greater extent that another, wherein the control and/or regulating unit 26 checks whether a difference 48 of at least 16 kHz, in particular at least 20 kHz, remains guaranteed.

The control and/or regulating unit 26 achieves compliance with EMC standards in the case of the low noise operation of multiple, in particular two, induction targets 32, 32', 32'', 32'''.

Figure 13A:
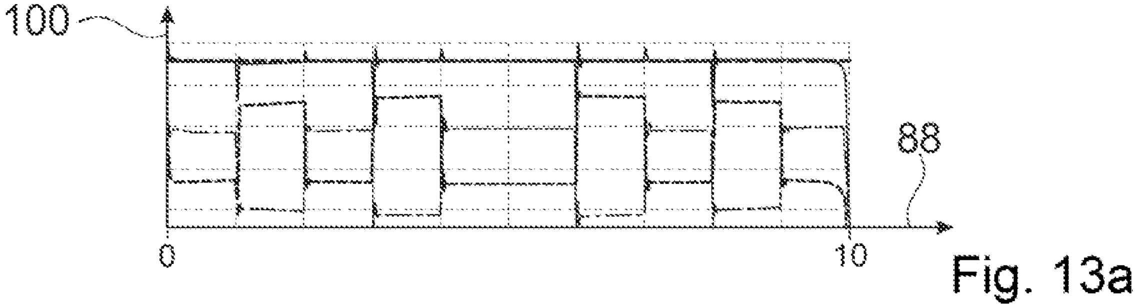
FIGS. 13*a* to 13*e* show schematic illustrations of a control with respect to a low-noise operation with the actual conductance for two induction targets being maintained constant.
Figure 13B:
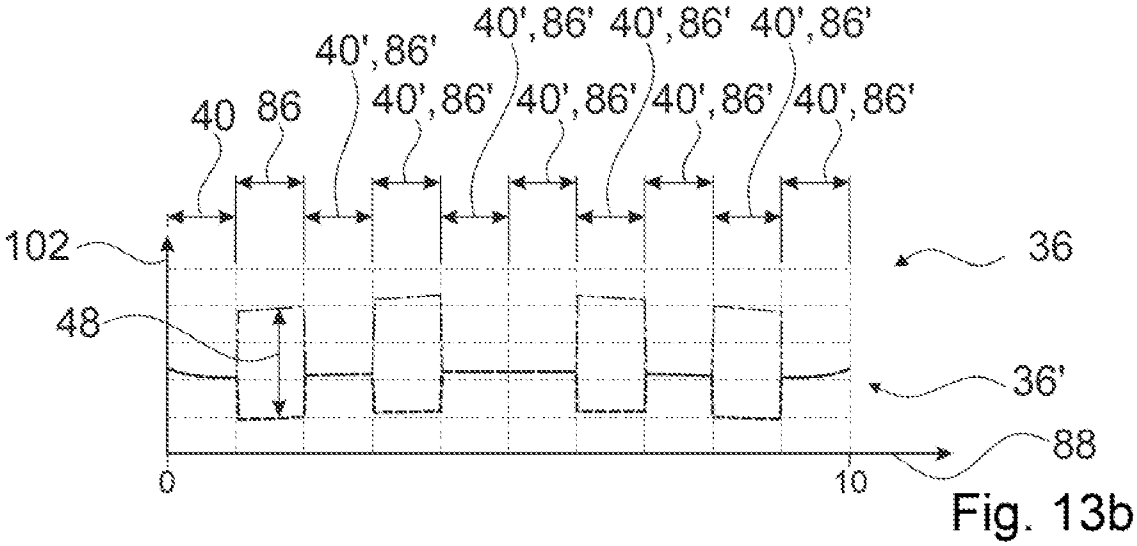
Figure 13C:
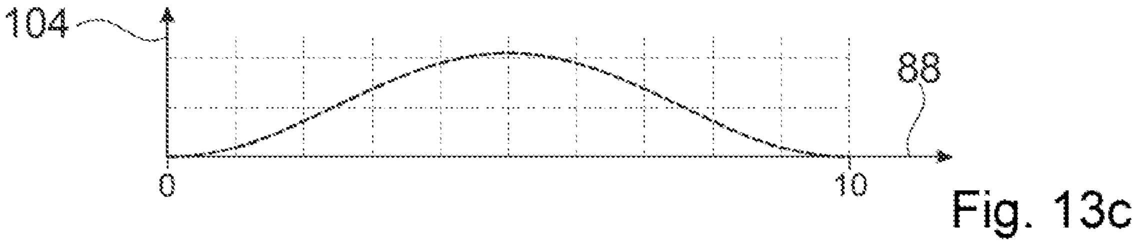
Figure 13D:
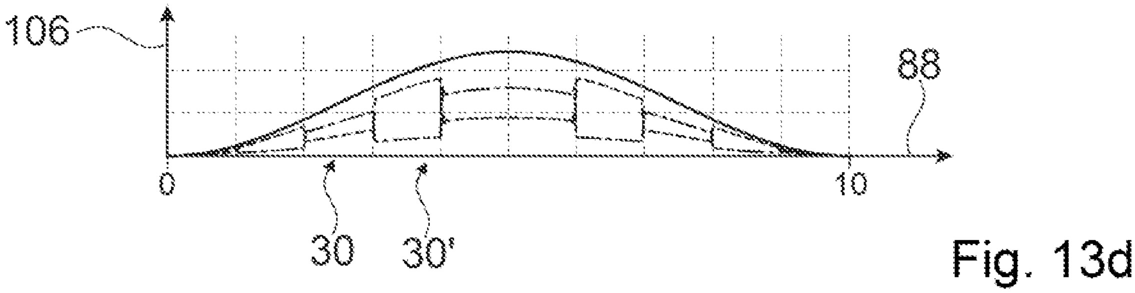
Figure 13E:
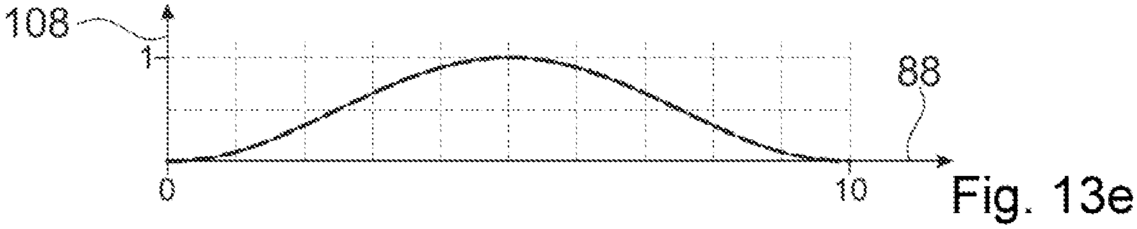

FIGS. 13*a* to 13*e* illustrate schematically a further example of a noise-free control for two units 80 that have an induction target 32, 32', 32'', 32''' performed by the control and/or regulating unit 26. In this example, the operating period 42 is precisely the same length as half the duration of the period of the alternating voltage supply. In FIGS. 13*a* to 13*d*, the time is plotted in milliseconds on the abscissa 88. In FIG. 13*a*, the actual conductance is plotted in ($m\Omega^{-1}$), in particular milliohm$^{-1}$, on the ordinate 100. In FIG. 13*b*, the frequency is plotted in kHz on the ordinate 102. In FIG. 13*c*, the squared voltage is plotted in $mV^2$, in particular in millivolt$^2$, on the ordinate 104. In FIG. 13*d*, the power is plotted in W, in particular watt, on the ordinate 106. In FIG. 13*e*, a unitless standardization variable is plotted on the ordinate 108.

The operating period 42 has nine switched-on intervals 40, 40'. In four of the nine switched-on intervals 40, 40', the control and/or regulating unit 26 controls the heating current frequencies 36 of the two units 80 that have an induction target 32, 32', 32'', 32''' to a difference 48 of at least 20 kHz, in particular at least 16 kHz. In the other five of the nine switched-on intervals 40, 40', the control and/or regulating unit 26 controls the heating current frequencies 36 of the two units 80 that have an induction target 32, 32', 32'', 32''' to a difference 48 of 0 kHz. In particular, the control and/or regulating unit 26 avoids intermodulation noises between the units 80 that have an induction target 32, 32', 32'', 32''''. The control and/or regulating unit 26 maintains constant the sum of the actual conductances of the units 80 that have an induction target 32, 32', 32'', 32''' over the entire operating period 42, in a similar manner to the example in FIGS. 12*a* to 12*e*.

Figure 14A:
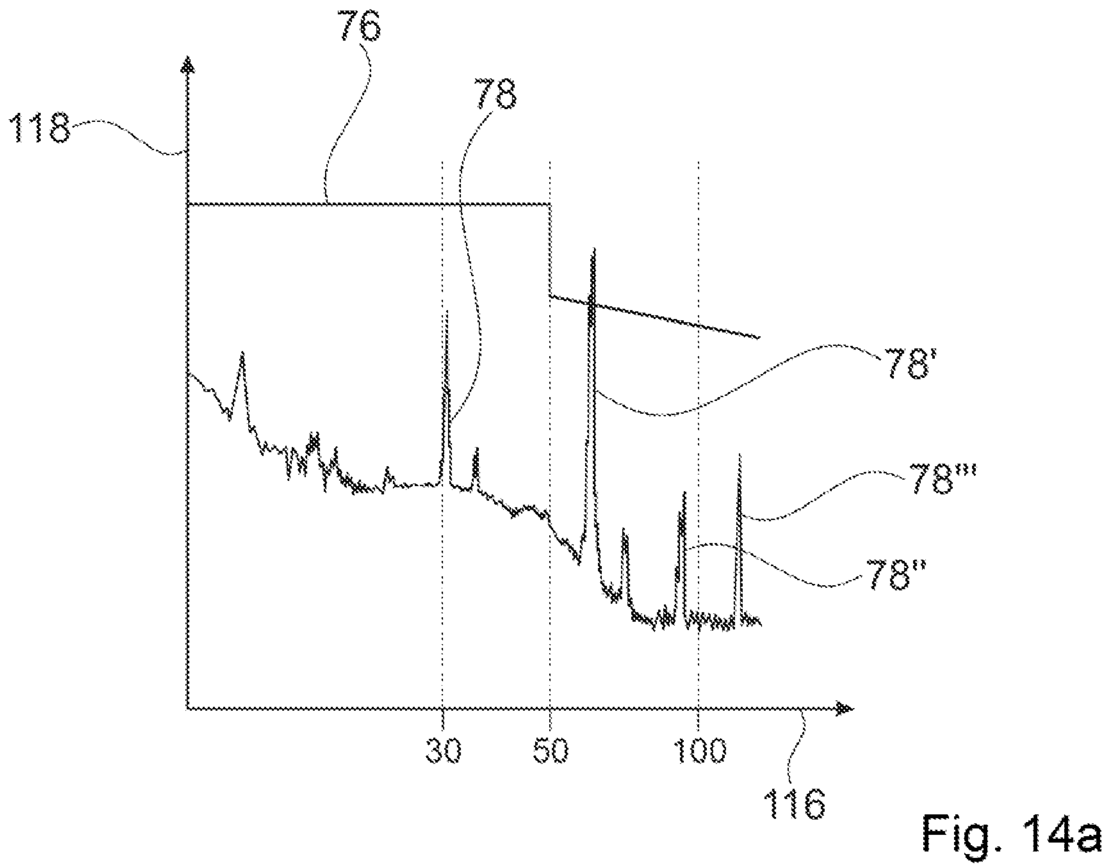
FIGS. 14*a* and 14*b* show schematic illustrations of a frequency spectrum of EMC emissions in the case of a fixed heating current frequency (a) and in the case of a variable heating current frequency (b) and FIG. 15 shows a schematic illustration of a method for operating the cooking appliance device.
Figure 14B:
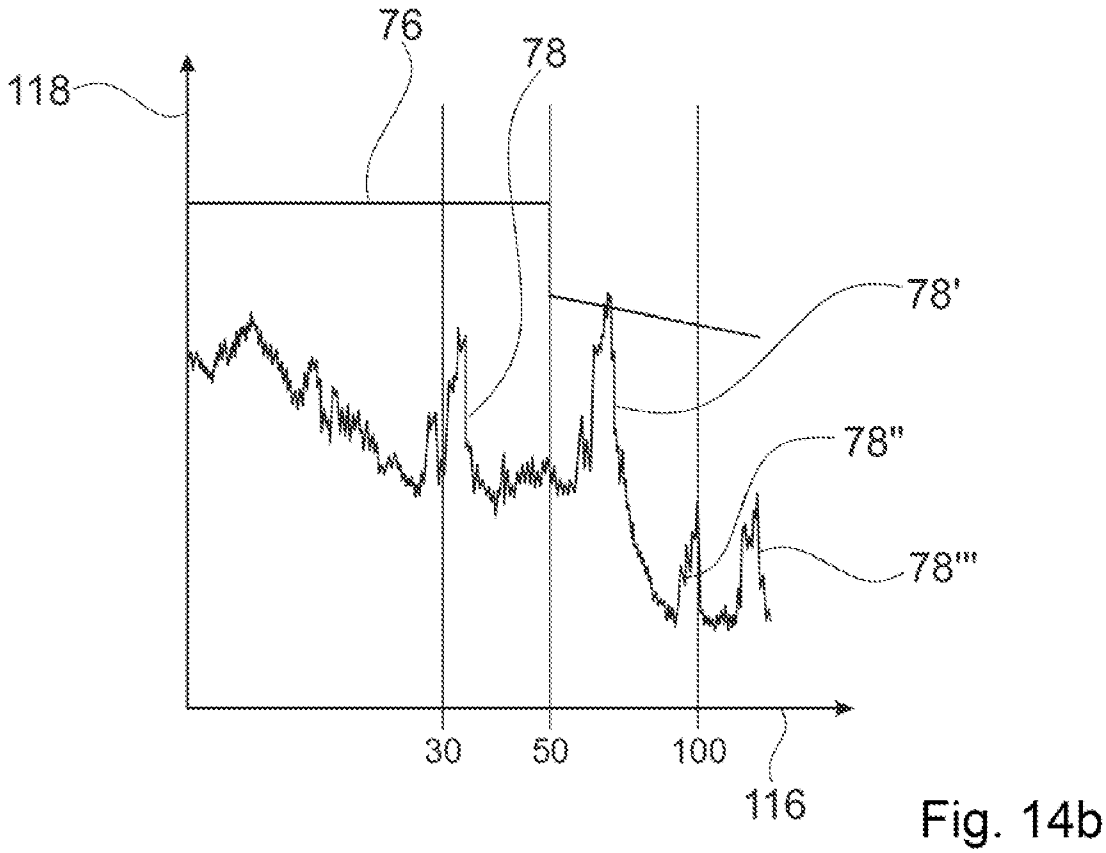

FIGS. 14*a* and 14*b* illustrate a frequency spectrum of an induction target 32, 32', 32'', 32'' ''' that is operated with a constant heating current frequency 36 (FIG. 14*a*) and that is operated with a variable heating current frequency 36 (FIG. 14*b*). In the FIGS. 14*a* and 14*b*, the frequency is plotted in kHz on the abscissa 116. In the FIGS. 14*a* and 14*b*, the voltage is plotted in (dBμV), in particular in decibel microvolts, on an ordinate 118. The frequency spectrum illustrates the harmonics 78 which respectively form peaks. The permissible limit values for the amplitudes of the harmonics 78 are illustrated respectively in the two illustrated spectra (FIGS. 14*a* and 14*b*) by a limit line 76. The control and/or regulating unit 26 changes the heating current frequency 36 so as to maintain the actual or complex conductance constant and meets the requirements of the EMC standards in the best possible manner. A constant heating current frequency 36 of 60 kHz is illustrated in FIG. 14*a*. In FIGS. 14*a* and 14*b*, the control and/or regulating unit 26 varies the heating current frequency 36 so as to minimize the extent to which the desired heating power 30, 30' is not maintained over the operating period 42. In particular the control and/or regulating unit 26 achieves a best possible compliance with the EMC standard.

It is conceivable that an operating period 42 has multiple mutually different switched-on intervals 40, 40' and/or switched-off intervals 46. It is thereby conceivable that the control and/or regulating unit 26 varies the heating current frequency 36 so as to maintain the actual and/or complex conductance constant in each switched-on interval 40, 40' of the operating period 42. It is likewise conceivable that the control and/or regulating unit 26 maintains constant the actual or complex conductance for one harmonic 78, in particular the first harmonic 78. In particular, the control and/or regulating unit 26 can perform a frequency analysis, in particular a signal analysis, such as for example a Fourier analysis, and determine the actual or complex conductance for one harmonic 78, in particular the first harmonic 78, by way of the following equations. For example, the following equations are disclosed for the first harmonic 78.

$$G_H = \frac{P_H}{v_{OH,rms}^2},$$

wherein $G_H$ is the actual conductance with respect to the first harmonic 78 and $P_H$ is the desired heating power in the case of the first harmonic 78 and $v_{0H}$ is the voltage in the operating period 42, said voltage being applied in this case by way of the unit 80 that has the induction target 32, 32', 32'', 32'''.

$$Y_H = \frac{I_H}{v_{OH}},$$

wherein $Y_H$ is the complex conductance with respect to the first harmonic 78 and $I_H$ is the current strength in the case of the first harmonic 78 and $v_{0H}$ is the voltage in the operating period 42, said voltage being applied in this case by way of the unit 80 that has the induction target 32, 32', 32'', 32'''. As a result, the control and/or regulating unit 26 can advantageously quickly adjust the heating current frequency 36.

It is conceivable that the control and/or regulating unit 26 performs a variation of the heating current frequency 36 so as to maintain constant an actual and/or complex conductance as soon as a measured average value for calculating the complex and/or actual conductance lies within the predetermined error tolerances. In particular, different algorithms are conceivable for finding a best possible adjustment of the heating current frequencies 36, in particular in the case of multiple operated induction targets 32, 32', 32'', 32'''.

It is conceivable that the control and/or regulating unit 26 determines, stores and recalls a variation of the heating current frequency 36 so as to maintain constant an actual and/or complex conductance for different desired values 30, 30' of an item of cookware 14, 14' 14''. In particular, the impedance of the unit 80 that has the induction target 32, 32', 32'', 32''' depends upon the type of material, in particular of the item of cookware 14, 14', 14'' and the inductor 22, 22', 22'', 22''' and the capacitor 68.

It is conceivable that the control and/or regulating unit 26 performs a variation of the heating current frequency 36, in particular so as to maintain constant the actual and/or complex conductance, as a "closed-loop" action such as a feedback loop or any other algorithm, irrespective of the number of units 80 that have induction targets 32, 32', 32'', 32''' or an induction target 32, 32', 32'', 32'''.

It is conceivable that the control and/or regulating unit 26 can achieve a reduction of the distortion of the supply current by adjusting the heating current frequency 36.

A procedure of controlling the actual conductance or complex conductance can be interpreted as a procedure of controlling the power or the current strength. Advantageously, the actual and complex conductance are not dependent upon the amplitude of the rectified supply voltage and equivalent electrical parameters of the item of cookware 14, 14', 14''.

It is conceivable that in a frequency sweep state the control and/or regulating unit 26 determines and/or stores critical heating current frequencies 36, in particular harmonics 78 and/or resonance frequencies, for each item of cookware 14, 14', 14''' of an induction target 32, 32', 32'', 32''', in particular for each unit 80 that has an induction target 32, 32', 32'', 32'''. It is furthermore conceivable that the control and/or regulating unit 26 exerts a frequency spread 74, in particular by means of the reference curve in the case of each control of a unit 80 that has an induction target 32, 32', 32'', 32''', on the critical frequencies, in particular harmonics 78 and/or resonance frequencies. It is conceivable that, in the case of maintaining an actual and/or complex conductance constant, the control and/or regulating unit 26 varies the heating current frequency 36 to an extent that the control and/or regulating unit 26 can avoid an additional frequency spread 74 by means of a reference curve 70. In particular, the control and/or regulating unit 26 can correct the heating current frequency 36 at any point in time to higher and lower values. It is conceivable that the control and/or regulating unit 26 performs the frequency spread 74, wherein the waveform of the supply current remains undistorted.

It is conceivable that the control and/or regulating unit 26 applies a power factor control such as maintaining the actual or complex conductance constant for any imaginable scenario, such as the number of items of cookware 14, 14', 14''' to be heated and/or the design of the hob 12 of a cooking appliance device 10. It is conceivable that, in the case of maintaining an actual and/or complex conductance constant, the control and/or regulating unit 26 can vary the heating current frequency 36 irrespective of the duration of the operating period 42. It is particularly advantageous that the control and/or regulating unit 26 can maintain the actual and/or complex conductance constant over the entire duration of half of the period duration of the alternating voltage supply. It is preferred that the duration of operating period 42 corresponds to the duration of half the period duration of the alternating voltage supply.

The control and/or regulating unit 26 can be embodied as an actual conductance controller or as a complex conductance controller. The control and/or regulating unit 26 can counteract a variation of the impedance of an induction target 32, 32', 32'', 32''' or of a unit 80 that has an induction target 32, 32', 32'', 32''' in an operating period 42, in particular can maintain the impedance constant. In particular, the control and/or regulating unit 26 can as an actual conductance controller control and/or regulate the achieved heating power over each operating period 42 so as to imitate the waveform of the squared rectified supply voltage.

It is conceivable that the control and/or regulating unit 26 selects an average value of the reference curve 70 of the frequency spread 74 as the value of the actual and/or complex conductance of the unit 80 that has the induction target 32, 32', 32'', 32''' that corresponds to the desired heating power 30, 30'.

It is conceivable that the control and/or regulating unit 26 can switch individual inverter units 38, in particular inverters 64, on and/or off.

It is conceivable that the control and/or regulating unit 26 can maintain the actual or complex conductance constant irrespective of the resonance frequency of a unit 80 that has an induction target 32, 32', 32", 32'". It is conceivable that, so as to maintain the actual or complex conductance constant, the control and/or regulating unit 26 must vary the heating current frequency 36, 36' in a surrounding area of the resonance frequency to a greater extent than when at a greater distance from the resonance frequency.

Figure 15:
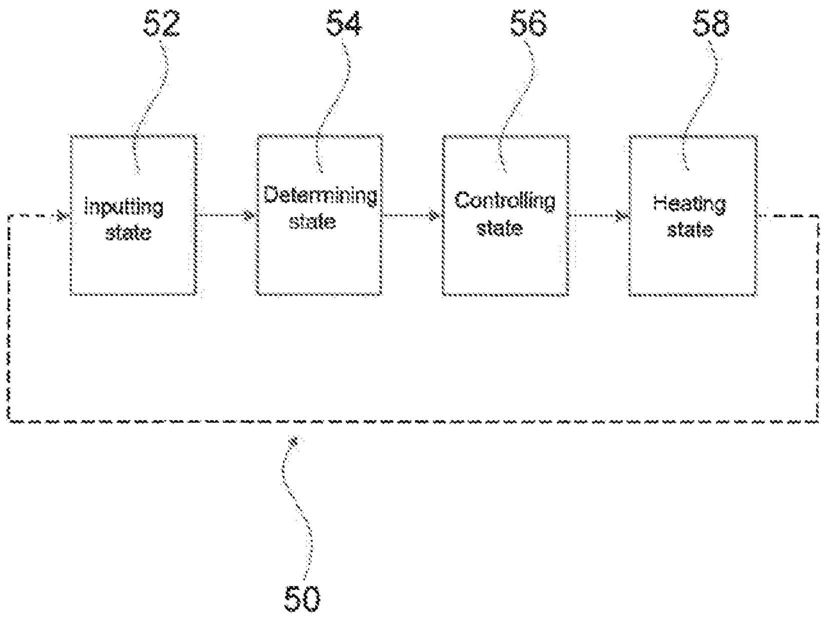

FIG. 15 illustrates schematically a flow diagram for a method for operating a cooking appliance device 10, in particular an induction hob device.

In at least one periodic continuous heating operating state 50, which is allocated an operating period 42, at least one induction target 32, 32', 32", 32'" is repetitively controlled and supplied with energy.

In the at least one continuous heating operating state 50, the at least one induction target 32, 32', 32", 32'" is operated in at least one switched-on interval 40, 40' of the operating period 42 with a heating power, in particular a desired heating power 30, 30' or with an excess power with respect to a desired heating power 30, 30'.

In the at least one continuous heating operating state 50, the heating current frequency 36 varies in the switched-on interval 40, 40' of the operating period 42.

The at least one continuous heating operating state 50 comprises at least four part states, in particular at least one inputting state 52, at least one determining state 54, at least one controlling state 56 and at least one heating state 58.

In the at least one inputting state 52, a desired heating power 30, 30' is input by an operator for at least one induction target 32, 32', 32", 32'".

In the at least one inputting state 52, the target frequency for the at least one induction target 32, 32', 32", 32'" is calculated in particular from a desired heating power 30, 30' that is set by the operator. In the at least one inputting state 52, the actual and/or complex conductance is calculated for the at least one induction target 32, 32', 32", 32'", in particular from a desired heating power 30, 30' that is set by the operator, in particular from the target frequency.

In the at least one determining state 54 that in particular follows on from the at least one inputting state 52, the switched-on intervals 40, 40' of each induction target 32, 32', 32", 32'" are calculated. In the at least one determining state 54, the actual and/or complex conductances are calculated, in particular the sum of the actual and/or complex conductances, of each induction target 32, 32', 32", 32'".

In the at least one controlling state 56 that follows on from the at least one determining state 54, the switched-on intervals 40, 40' and switched-off intervals 46 are calculated for each induction target 32, 32', 32", 32'", which is to output a desired heating power 30, 30' in an operating period 42, so as to avoid intermodulation noises and distributed over the operating period 42 so as to comply with EMC standards.

In the at least one heating state 58 that in particular follows on from the at least one controlling state 56, each induction target 32, 32', 32", 32'" is operated over at least one operating period 42 with the selected switched-on intervals 40, 40' and/or switched-off intervals 46 so as to provide the set desired heating power 30, 30'. In the at least one heating state 58, the heating current frequency 36 is varied in at least one switched-on interval 40, 40' for at least one induction target 32, 32', 32", 32'", in particular a unit 80 that has an induction target 32, 32', 32", 32'". In particular, in the at least one heating state 58, the actual conductance and/or the complex conductance and/or the impedance is maintained constant in at least one switched-on interval 40, 40' for at least one induction target 32, 32', 32", 32'", in particular a unit 80 that has an induction target 32, 32', 32", 32'".

In the at least one continuous heating state 50, the part states are performed repetitively, wherein the parameters that are selected/calculated and/or determined in the part states are maintained in the absence of a desired heating power 30, 30' that has been changed by an operator for at least one induction target 32, 32', 32", 32'".

The invention claimed is:

1. A cooking appliance device, comprising at least one selected from the group consisting of a controller and a regulator provided such that in a periodic continuous heating operation state, which is allocated at least one operating period, an induction target is repetitively controlled, supplied with energy and operated in a switched-on interval of the operating period with a heating power, and that in the continuous heating operating state a heating current frequency for the induction target in the switched-on interval of the operating period is varied, wherein the at least one selected from the group consisting of a controller and a regulator is provided to apply in the continuous heating operating state a frequency spread by using a reference curve of at least one selected from the group consisting of an actual conductance and a complex conductance of a unit that has the induction target to a harmonic of one of the heating current frequencies.

2. The cooking appliance device of claim 1, constructed in the form of an induction hob device.

3. The cooking appliance device of claim 1, wherein the at least one selected from the group consisting of a controller and a regulator is provided to maintain in the continuous heating operating state an impedance of a unit, which has the induction target, essentially constant within the switched-on interval.

4. The cooking appliance device of claim 1, wherein the at least one selected from the group consisting of a controller and a regulator is provided to maintain in the continuous heating operating state an actual conductance of a unit, which has the induction target, essentially constant within the switched-on interval.

5. The cooking appliance device of claim 1, wherein the at least one selected from the group consisting of a controller and a regulator is provided to maintain in the continuous heating operating state a complex conductance of a unit, which has the induction target, essentially constant within the switched-on interval.

6. The cooking appliance device of claim 1, wherein the at least one selected from the group consisting of a controller and a regulator is provided to control and/or regulate the heating current frequency in the continuous heating operating state.

7. The cooking appliance device of claim 1, wherein the at least one selected from the group consisting of a controller and a regulator is provided to constantly vary in the continuous heating operating state the heating current frequency in the switched-on interval.

8. A cooking appliance, comprising the cooking appliance device of claim 1.

9. The cooking appliance of claim 8, constructed in the form of a hob.

10. The cooking appliance device of claim 1, wherein the at least one selected from the group consisting of a controller and a regulator is provided such that in the continuous heating operating state a second induction target is repetitively controlled, supplied with energy, and operated in a second switched-on interval of the operating period with a heating power.

11. A cooking appliance device, comprising at least one selected from the group consisting of a controller and a regulator provided such that in a periodic continuous heating operation state, which is allocated at least one operating period, an induction target is repetitively controlled, supplied with energy and operated in a switched-on interval of the operating period with a heating power, and that in the continuous heating operating state a heating current frequency for the induction target in the switched-on interval of the operating period is varied, wherein the at least one selected from the group consisting of a controller and a regulator is provided such that in the continuous heating operating state a second induction target is repetitively controlled, supplied with energy, and operated in a second switched-on interval of the operating period with a heating power.

12. The cooking appliance device of claim 11, wherein the at least one selected from the group consisting of a controller and a regulator is provided to vary in the continuous heating operating state a second heating current frequency for the second induction target in the second switched-on interval of the operating period.

13. The cooking appliance device of claim 11, wherein the at least one selected from the group consisting of a controller and a regulator is provided to avoid in the continuous heating operating state intermodulation noise of the first and second induction targets.

14. The cooking appliance device of claim 11, wherein the at least one selected from the group consisting of a controller and a regulator is provided to constantly vary in the continuous heating operating state the heating current frequency in the switched-on interval.

15. A method for operating a cooking appliance device, said method comprising:

repetitively controlling an induction target in a periodic continuous heating operating state, which is allocated an operating period;

supplying the induction target with energy;

operating the induction target in a switched-on interval of the operating period with a heating power;

varying in the continuous heating operating state a heating current frequency for the induction target in the switched-on interval of the operating period; and applying in the continuous heating operating state a frequency spread by using a reference curve of at least one selected from the group consisting of an actual conductance and a complex conductance of a unit that has the induction target to a harmonic of one of the heating current frequencies.

16. The method of claim 15 for operating an induction hob device.

17. The method of claim 15, further comprising maintaining in the continuous heating operating state an impedance of a unit that has the induction target essentially constant within the switched-on interval.

18. The method of claim 15, further comprising maintaining in the continuous heating operating state an actual conductance of a unit, which has the induction target, essentially constant within the switched-on interval.

19. The method of claim 15, further comprising maintaining in the continuous heating operating state a complex conductance of a unit, which has the induction target, essentially constant within the switched-on interval.

20. The method of claim 15, further comprising controlling and/or regulating the heating current frequency in the continuous heating operating state.

21. The method of claim 15, further comprising constantly varying in the continuous heating operating state the heating current frequency in the switched-on interval.

22. The method of claim 15, further comprising:

repetitively controlling in the continuous heating operating state a second induction target;

supplying the second induction target with energy; and operating the second induction target in a second switched-on interval of the operating period with a heating power.

23. The method of claim 22, further comprising varying in the continuous heating operating state a second heating current frequency for the second induction target in the second switched-on interval of the operating period.

24. The method of claim 22, further comprising avoiding in the continuous heating operating state intermodulation noise of the first and second induction targets.

* * * * *